United States Patent [19]

Kawasaki

[11] Patent Number: 5,255,043
[45] Date of Patent: * Oct. 19, 1993

[54] APPARATUS FOR MAINTAINING CONSTANT IMAGE MAGNIFICATION IN A CAMERA SYSTEM

[75] Inventor: Masahiro Kawasaki, Tokyo, Japan

[73] Assignee: Asahi Kogaku Kogyo Kabushiki Kaisha, Tokyo, Japan

[*] Notice: The portion of the term of this patent subsequent to Nov. 19, 2008 has been disclaimed.

[21] Appl. No.: 852,759

[22] Filed: Mar. 16, 1992

Related U.S. Application Data

[63] Continuation of Ser. No. 581,539, Sep. 12, 1990, abandoned, which is a continuation of Ser. No. 400,014, Aug. 29, 1989, Pat. No. 5,066,969.

[30] Foreign Application Priority Data

Aug. 30, 1988 [JP] Japan .................. 63-215991

[51] Int. Cl.$^5$ .................. G03B 5/00; G03B 13/36
[52] U.S. Cl. .................. 354/402; 354/195.1; 354/270; 354/286
[58] Field of Search ............. 354/400, 402, 455, 286, 354/195.1, 195.12, 271.1, 270

[56] References Cited

U.S. PATENT DOCUMENTS

| | | | |
|---|---|---|---|
| 4,437,752 | 3/1984 | Akashi et al. | 354/289.12 |
| 4,477,164 | 10/1984 | Nakai et al. | 354/286 |
| 4,509,846 | 4/1985 | Nakai et al. | 354/286 X |
| 4,529,288 | 7/1985 | Nakai et al. | 354/286 X |
| 4,560,267 | 12/1985 | Nakai et al. | 354/286 X |
| 4,596,449 | 6/1986 | Iwata et al. | 350/429 |
| 4,737,812 | 4/1988 | Hasegawa et al. | 354/400 |
| 4,739,356 | 4/1988 | Ogura et al. | 354/286 |
| 4,758,854 | 7/1988 | Saegusa | 354/286 |
| 4,790,649 | 12/1988 | Harada et al. | 354/400 |
| 4,812,868 | 3/1989 | Utagawa et al. | 354/402 |
| 4,841,322 | 6/1989 | Kawasaki et al. | 354/400 |
| 4,841,327 | 6/1989 | Yamamoto et al. | 354/271.1 |
| 4,851,869 | 7/1989 | Ishimura et al. | 354/195.1 |
| 4,853,732 | 8/1989 | Suzuki et al. | 354/286 X |
| 4,857,951 | 8/1989 | Nakajima et al. | 354/400 |
| 4,860,113 | 8/1989 | Miyamoto et al. | 354/286 X |
| 4,862,208 | 8/1989 | Yamada et al. | 354/286 X |
| 4,896,181 | 1/1990 | Saegusa et al. | 354/286 |
| 4,912,494 | 3/1990 | Tanaka et al. | 354/402 |
| 4,945,376 | 7/1990 | Kawasaki et al. | 354/400 |
| 4,951,075 | 8/1990 | Tokumaru et al. | 354/400 |
| 4,959,728 | 9/1990 | Takahashi et al. | 354/286 X |
| 5,030,982 | 7/1991 | Takebayashi | 354/400 |
| 5,038,163 | 8/1991 | Hirasawa | 354/400 |
| 5,066,969 | 11/1991 | Kawasaki | 354/402 |

*Primary Examiner*—W. B. Perkey
*Attorney, Agent, or Firm*—Sandler Greenblum & Bernstein

[57] ABSTRACT

A camera system including a camera body having a focus adjusting mechanism, a photographic lens having a diaphragm adjusting mechanism and a power zoom mechanism incorporated therein, an object distance measuring device, and a drive for driving the focal length adjusting mechanism of the photographic lens, so that the photographic lens and the camera body are compatible with conventional camera body and photographic lens.

48 Claims, 19 Drawing Sheets

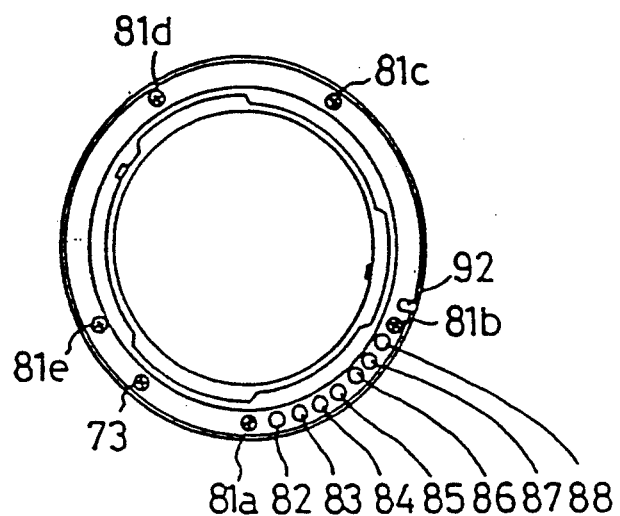
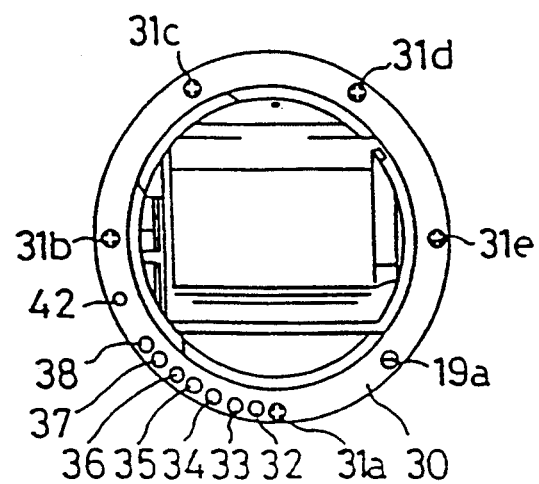

APPARATUS FOR MAINTAINING CONSTANT IMAGE MAGNIFICATION IN A CAMERA SYSTEM

This application is a continuation of application Ser. No. 07/581,539, filed Sep. 12, 1990, now abandoned, which is a continuation of Application Ser. No. 07/400,014 filed on Aug. 29, 1989, which issued as U.S. Pat. No. 5,066,969 on Nov. 19, 1991.

BACKGROUND OF THE INVENTION

1. Field of the Invention

The present invention relates to a for a single-lens reflex camera having an interchangeable lens, and more precisely it relates to a compatible camera system having an automatic focusing function, automatic exposure function and electrically driven power zoom function.

2. Description of Related Art

A single-lens reflex camera usually has an interchangeable lens, and accordingly, it is necessary to provide means for transmitting data peculiar to the lens, such as an open F-number (minimum F-number) which is used for an automatic exposure function and an automatic focusing function to a camera body in which the necessary arithmetic operations are effected.

To this end, a conventional photographic lens has a lens ROM which stores information peculiar to the photographic lens. A group of electrical contacts are provided, both on the camera body and on the photographic lens, so that when the lens is mounted to the camera body, as disclosed, for example, in Japanese Unexamined Patent Publication No. 63-184719, which is co-pending as U.S. Ser. No. 266,328 filed by the same assignee as the present application the lens is electrically connected to the camera body. The entire disclosure of the co-pending U.S. patent application Ser. Nos. 266,328 and U.S. Ser. No. 143,900 are expressly incorporated by reference herein.

In a conventional single-lens reflex camera, data necessary for the arithmetic operations are transmitted only in one direction, i.e. from the photographic lens to the camera body, so that based on the data, the focusing operations, actuation of the diaphragm and change of the focal length, etc. are effected by a driving power which is supplied from the camera body.

Recent motor technique developments make it possible to provide a compact and small motor as a driving source on the photographic lens without increasing the size of the lens as a whole.

A single-lens reflex camera is usually intended to be used with different photographic lenses having different steady information (fixed information), so that when the number of parameters to be controlled increases, a control unit provided in the camera body needs progressively increased arithmetic capability, resulting in an increased burden on the camera body.

Accordingly, it is preferable that the individual photographic lenses possess data processing capability for the various functions of the photographic lenses.

An advantage of the present invention is that a new camera system (camera body or photographic lens) is compatible with a conventional camera system (photographic lens or camera body).

SUMMARY OF THE INVENTION

The primary object of the present invention is to provide a photographic lens which can supply information for various functions of a camera body to a camera body. The photographic lens can be applied not only to a camera body having memory means and arithmetic means incorporated therein, but also to an automatic exposure control camera body (AE camera) or an automatic exposure and focus control camera body (AEAF camera).

To achieve the object mentioned above, according to the present invention, there is provided a photographic lens that is detachably mounted to a camera body, comprising a group of electrical contacts which are to be connected to the camera body, first information transfer means for transmitting a first information set peculiar to the lens through a part of or all of the electrical contact group, a second information transfer means for transmitting a plurality of variable information peculiar to the lens through memory means connected to the electrical contact group to the camera body, a third information transfer means for transmitting and receiving information to and from the camera body through an arithmetic/control means connected to the electrical contact group, and, switching means for selecting either the first information transfer means, second information transfer means or third information transfer means, in accordance with the state of connection of the electrical contact group to the camera body.

Another object of the present invention is to provide a camera body which can transmit and receive information to and from the above described photographic lens a photographic lens having a conventional lens ROM, or a photographic lens having only diaphragm value information.

To achieve the above-mentioned object, according to another aspect of the present invention, there is provided a camera body to which a photographic lens is detachably mounted, comprising a group of electrical contacts provided on a camera body mount to which the photographic lens is mounted, means for judging the type of photographic lens in accordance with the state of connection of the photographic lens to the electrical contacts, first control means for controlling the photographic lens in response to a first information set which represents a first lens type in which the photographic lens supplies only the first information set to the camera body, second control means for controlling the photographic lens in response to a plurality of second information which are peculiar to the photographic lens and which represent a second lens type in which the photographic lens supplies the second information to the camera body through a memory means connected to the electrical contact group, and, third control means for controlling the photographic lens in response to a third information set which represents a third lens type in which the photographic lens has an arithmetic/control means connected to the electrical contact group in addition to the memory means and receives and transmits the third information to and from the camera body.

Still another object of the present invention is to provide a single-lens reflex camera system in which the transmission and reception of information can be effected with high precision between a camera body and a photographic lens.

To achieve this object, according to another aspect of the present invention, a camera system is provided comprising a photographic lens and a camera body as mentioned above, respectively, in combination.

BRIEF DESCRIPTION OF THE DRAWINGS

The invention will be described below in detail with reference to the accompanying drawings, in which:

FIG. 10 shows a front view of the lens mount shown in FIG. 9;

FIG. 11 shows a front view of the mount of a conventional AEAF camera body;

DETAILED DESCRIPTION OF PREFERRED EMBODIMENT

In the following description, a camera body and a photographic lens corresponding to the present invention are referred to as a new body and a new lens hereinafter to distinguish them from camera bodies and lenses used in conventional systems.

Figure 1:
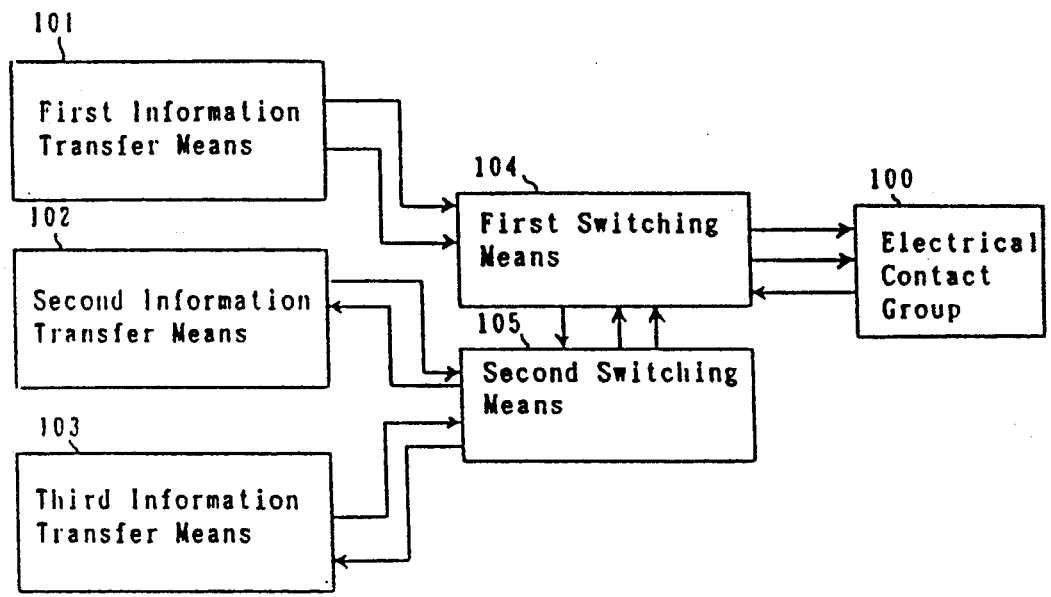
FIG. 1 shows a diagram corresponding to a photographic lens relating to the present invention.

A new lens 3 relating to the present invention, which is detachably attached to a camera body 1 comprises, as shown in FIG. 1, a group of electrical contacts 100 which are to be connected to a camera body, first information transfer means 101 for transmitting a first set of information that is specific to the lens through a part of or all of the electrical contact group 100, a second information transfer means 102 for transmitting a plurality of variable information that is specific to the lens through a memory means connected to the electrical contact group 100 to the camera body, a third information transfer means 103 for transmitting and receiving information to and from the camera body 1 through an arithmetic/control means connected to the electrical contact group, and, first and second switching means 104 and 105 for selecting the first information transfer means 101, the second information transfer means 102 or the third information transfer means 103, in accordance with the state of connection of the electrical contact group 100 to the camera body 1.

Figure 2:
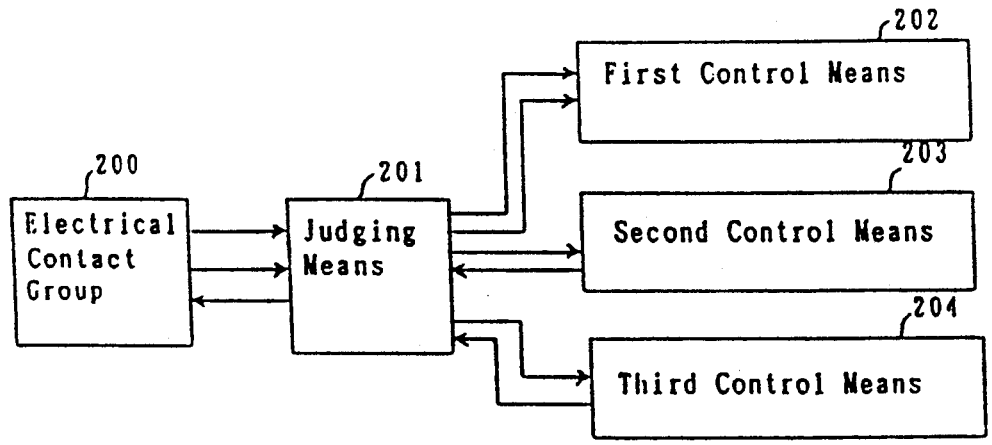
FIG. 2 shows a diagram corresponding to a camera body relating to the present invention.

The new camera body 1 of the present invention to which a lens is detachably mounted comprises, as shown in FIG. 2, a group of electrical contacts 200 provided on a camera body mount to which the photographic lens is mounted, determining means 201 for judging the type of photographic lens that is to be attached to a camera body lens in accordance with the state of connection of the photographic lens to the electrical contacts 200, first control means 202 for controlling the photographic lens in response to a first set of information which consists of a pair of information of the electrical contacts as a whole and which represents a first type in which the photographic lens supplies only the first information to the camera body, second control means 203 for controlling the photographic lens in response to a plurality of a second set of information which are specific to the photographic lens and which represent a second type in which the photographic lens supplies the second information to the camera body through a memory means connected to the electrical contact group, and, third control means 204 for controlling the photographic lens in response to a third set of information which represents a third type in which the photographic lens has an arithmetic/control means connected to the electrical contact group in addition to the memory means and receives and transmits the third set of information from and to the camera body.

Figure 3:
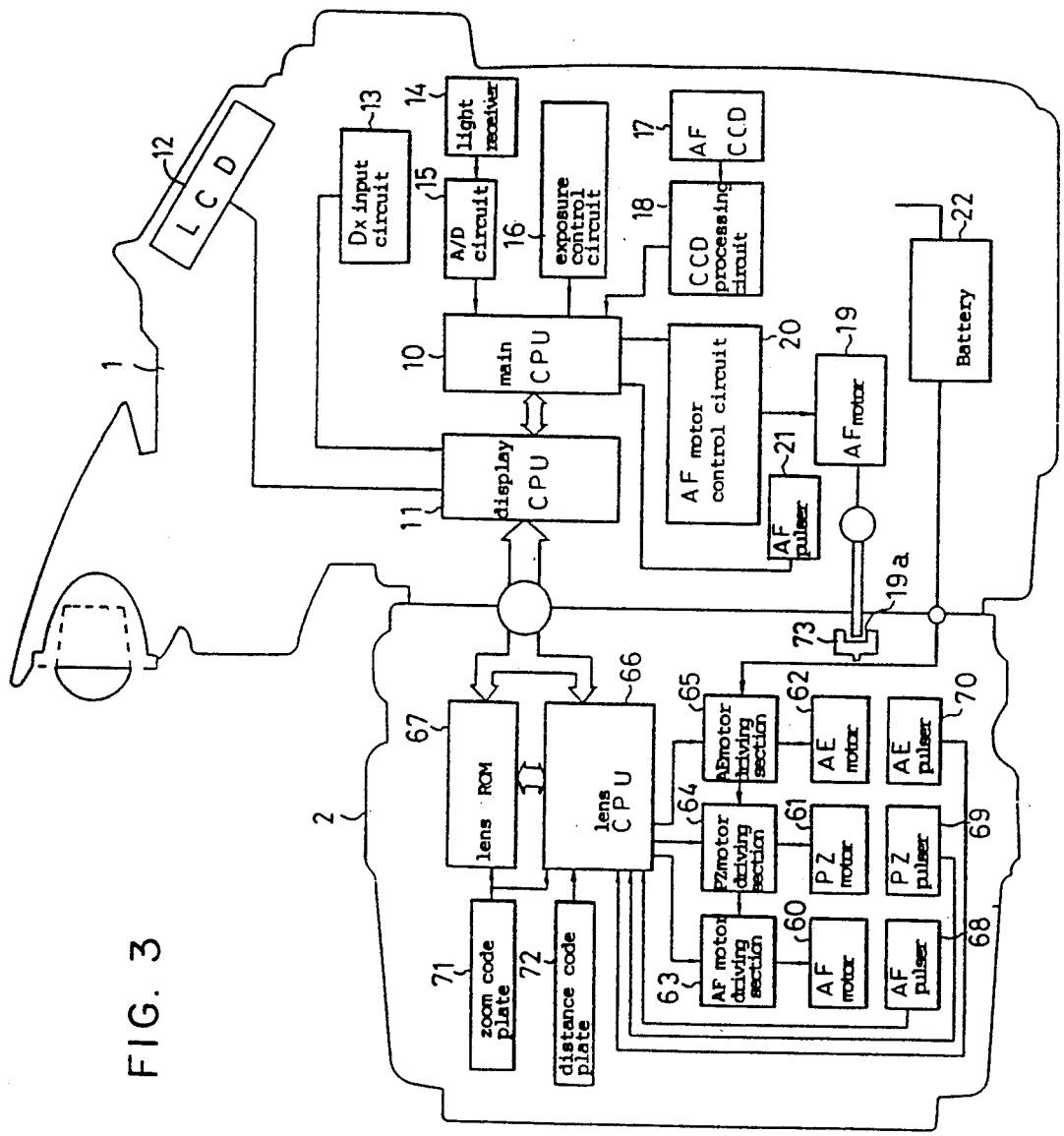
FIG. 3 shows a block diagram representing a first embodiment of the camera system according to the present invention.

FIG. 3 is a block diagram which outlines the new system which is structured by a combination of the new lens 2 and new camera body 1 of the present invention.

The new camera body 1 is equipped with two CPUs: a main CPU 10 which processes various information for photographing and a display CPU 11 which is used to input information from switches and to exchange and display information for the new lens 2. Besides the main CPU 10 and display CPU 11, the new camera body 1 also includes an LCD panel 12 which displays various information, a Dx code input circuit 13 where the ISO sensitivity of film is inputted with a Dx code which is printed on the film cartridge, a light receiver 14 which measures the brightness of a subject by an incident light beam through a photographic lens, an A/D converter 15 which converts analog signals of an output of the light receiver 14 into digital signals, an exposure control circuit 16 which controls a shutter in accordance with various photographic conditions, an automatic focus change coupled device (AF CCD) 17 for detecting a focus condition which receives rays of a subject image formed by the incident light beam through the photographic lens, and a CCD process circuit 18, which detects the focusing state of the photographic lens by an output of the AF CCD 17.

An auto focus (AF) motor 19, which serves to focus a lens, transfers a drive force to a conventional photographic lens through a coupler 19a (see FIGS. 3 and 4) which is provided on the mount portion when a conventional type photographic lens (which does not provide an AF motor is mounted to the camera body 1. The main CPU 10 controls the amount of rotation of the AF motor 19 through an AF motor control circuit 20 according to the signal of the CCD process circuit 18 and the pulse signal of the AF pulse 21, which detects the amount of rotation of the AF motor 19.

A battery 22 supplies electric power to each active element in the camera body described above, to a motor in a new photographic lens to be described later, and to the CPUs.

On the other hand, a new lens 2 can house three motors (an AF motor 60, a power zoom (PZ) motor 61, and an automatic diaphragm (stop) control (AE) motor 62). The three motors allow an auto focus operation, a power zoom operation, and a diaphragm control operation to be conducted with the drive forces in the camera body.

The new lens 2 provides a conventional gear mechanism (or cam mechanism) which performs the focusing and zooming operations by relatively moving each movable lens by rotating a focusing (cam) ring or a zooming cam ring. The AF motor 60 and PZ motor 61 rotate the individual cam rings.

Each motor is controlled by a lens CPU 66 that functions as a computing means (an arithmetic/control means) through AF motor drive section 63, PZ motor drive section 64, and AE motor drive section 65.

A lens ROM 67, which is a storage means for storing information intrinsic to a lens, acts as an information input means to the lens CPU 66. An Af pulser 68, PZ pulser 69, and AE pulser 70 converts the amount of driving force of each motor into pulses and detects the pulses. A zoom code plate 71 and distance code plate 72 detect a rotation position of the zooming cam ring and focusing cam ring, respectively.

The code plate comprises a code plate which is fixed to a cam ring and a plurality of brushes which is in slidable contact with the code plate. The code plate detects an absolute rotating position of each cam ring by the contact state of the brushes. The "code plate" includes such a code plate and brush in this specification. FIG. 3 shows the code plate as a general term.

The lens CPU 66 is connected to the control sections and the input means described above. The lens CPU 66 can communicate with the new body 1 through a set of electric contacts to be described below. For example, the lens CPU 66 has a function which receives the quantity (amount) of defocusing detected by the camera body, references data stored in the ROM 67, computes the amount of drive force, detects the amount of drive force by the AF pulser 68, and drives the AF motor 60; or a function which detects the amount of drive force by the AE pulser 70 in accordance with a stop number which is determined by the camera body and rotates the AE motor 62.

The new lens 2 can include an AF coupler 73 which drives a focus lens so that the AF motor of the camera body can perform the focusing operation.

STRUCTURE AND ARRANGEMENT OF A GROUP OF ELECTRIC CONTACTS ON MOUNT

Figure 4:
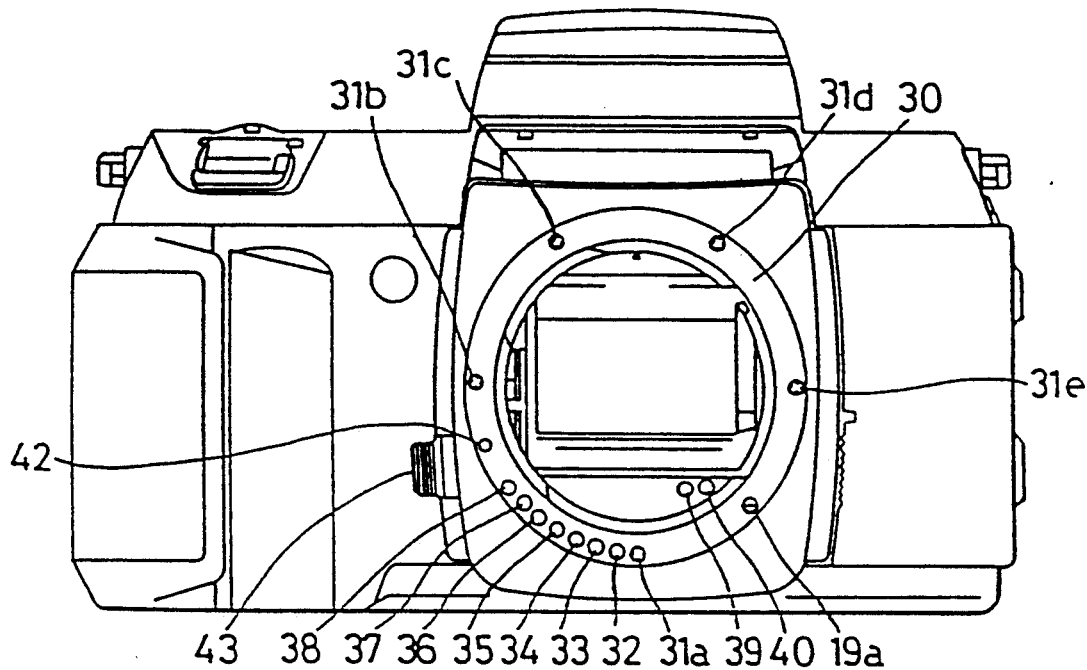
FIG. 4 shows a front view of the new camera body; of FIG. 2

The structure of the mount portion which connects the new body 1 to the new lens 2 is described, along with the position of the electric contacts. In this camera system, a bayonet mount system, which connects a lens and a body by engaging a plurality of contacts provided on both of the lens mount and the body mount, is described FIG. 4 shows a front view of the new camera body 1. On the lens mount opening, a mount ring 30 is fixed to the new camera body 1 with five screws 31a to 31e.

On the mount ring 30, a body side contact Fmax1 32, body side contact Fmax2 33, body side contact Fmax3 34, body side contact Fmin1 35, body side contact Fmin2 36, and body side contact Cont 38 are provided, each of which is insulated from the mount ring 30 and protrudes therefrom. A body side contact A/M 37 is provided in such a manner does not protrude from the mount ring 30 and that it is insulated from the ring 30 (see FIG. 6).

A body side contact $V_{BATT}$ 40 and body side contact Vdd 41 are provided inside the mount ring 30 (see FIG. 4).

Pin 42 is used to prevent a lens from rotating. The pin 42 is normally protruded by a spring force, and is inserted into an engagement hole of the lens, thereby prohibiting the lens thereon from rotating. By pushing a lever 43, the pin 42 is retracted into the mount ring 30 thereby allowing the lens to rotate for removal purposes.

Figure 5:
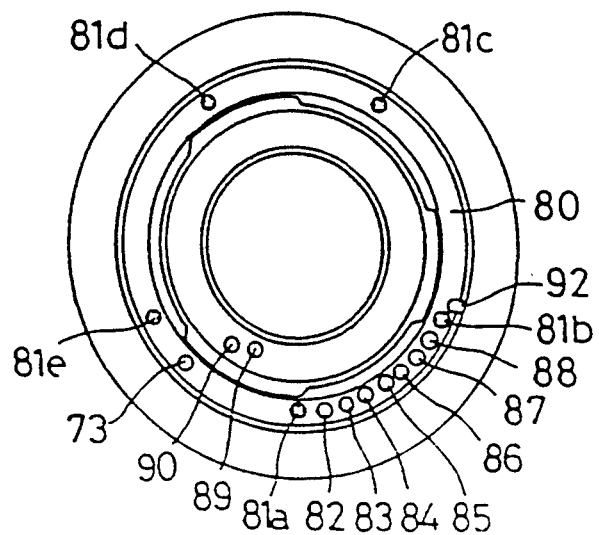
FIG. 5 shows a front view of a new lens mount that is part of the lens described in FIG. 1 the new lens mount.

As shown in FIG. 5, a mount ring 80 is fixed with five screws 81a to 81e to a mount portion of the new lens 2.

On the mount ring 80, a lens side contact Fmax1 82, lens side contact Fmax2 83, lens side contact Fmax3 84, lens side contact Fmin1 85, and lens side contact Fmin2 86 are provided, each of which is insulated from the mount ring 80 and which do not protrude therefrom. A lens side contact Cont 87 and lens side contact A/M 88 are provided in such a manner that they protrude from the mount ring 80 while being insulated from the ring 80 (see FIG. 7).

A lens side contact $V_{BATT}$ 90 and a lens side contact Vdd 89 are provided inside the mount ring 80.

An engagement hole 92, which prohibits the lens from rotating when the pin 42 is engaged, is provided on the mount ring 80. Also, the above mentioned AF coupler 73 is provided on the mount ring.

In the above contact arrangement, when the new lens 2 is mounted on the new camera body 1, corresponding contacts are electrically connected. The protrusion and retraction setting of each contact is used for distinguishing a combination state of a conventional camera system and a new camera system of the present invention, as will be described below.

In the above example, two set of contacts 39, 40 and 89, 90 are provided inside the mount ring. However, it is also possible to provide all the contacts on or inside the mount ring.

NEW CAMERA BODY CIRCUIT

A new camera body circuit is described below in accordance with more detailed circuit diagrams.

Figure 6:
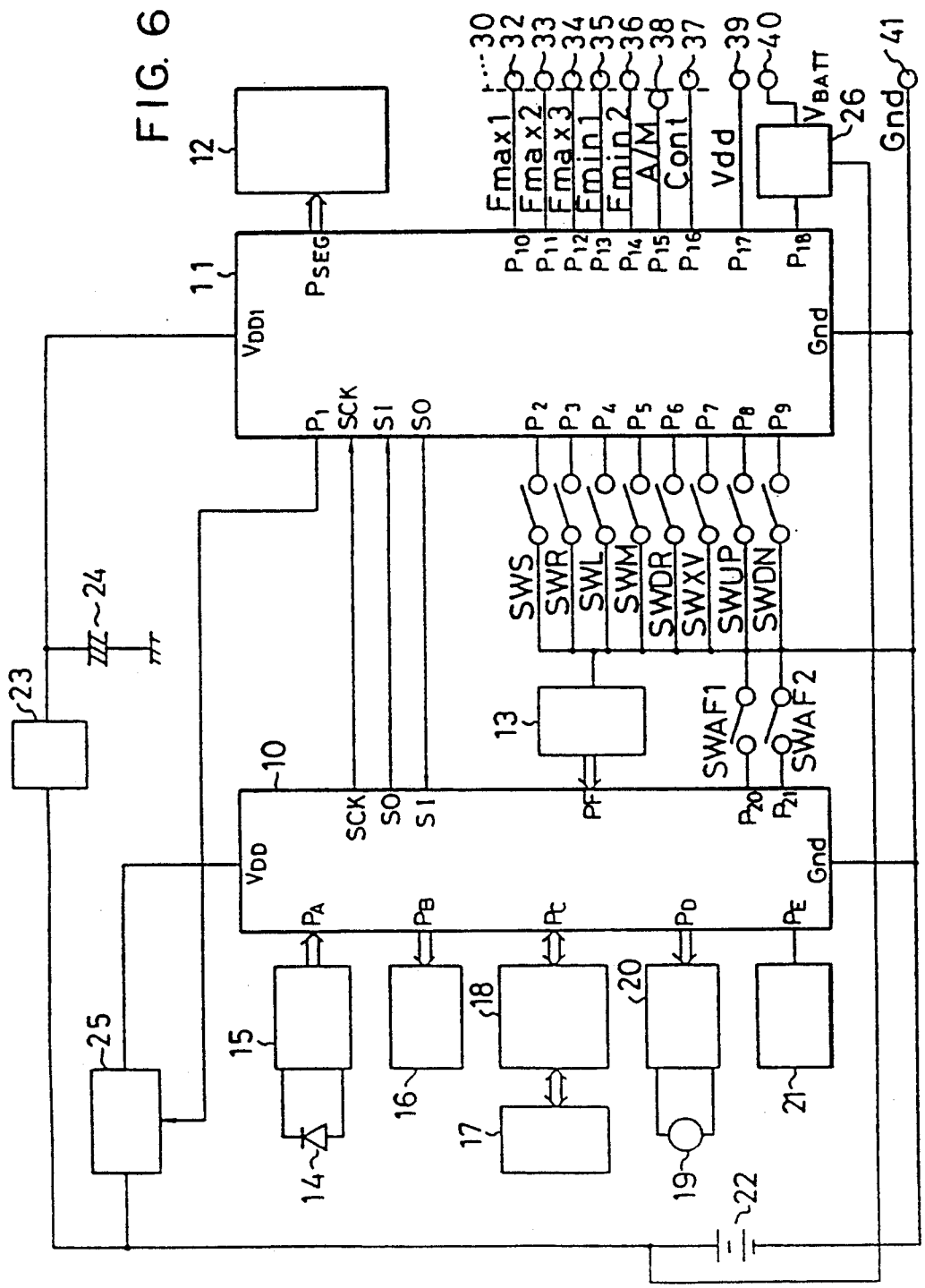
FIG. 6 shows a circuit diagram of the new camera body.

FIG. 6 shows a circuit of the new camera body 1.

At terminal $V_{DD1}$ of the display CPU 11, a voltage of battery 22 is supplied through a constant voltage regulator 23 which is backed up by a super capacitor 24. The constant voltage is always supplied to terminal $V_{DD1}$.

Terminal P1 of the display CPU 11 is connected to a DC/DC converter 25 which turns on/off the power of the main CPU 10. Terminal P2 is connected to a photometry switch SWS, which is turned on when a shutter button is depressed halfway. Terminal P3 is connected to a release switch SWR which is turned on when the shutter button is fully depressed. Terminal P4 is connected to a lock switch SWL, which is turned on so as to get ready for the camera to photograph. Data of each switch SWS, SWR and SWL is inputted to the display CPU 11 through terminals P2, P3 and P4 respectively. While the lock switch SWL is turned on, when the photometry switch SWS or the release switch SWR is turned on and when data on the lens side is inputted to the main CPU 10, the DC/DC converter 25 supplies power to terminal $V_{DD}$ of the main CPU 10 by a command from the display CPU 11 that is sent to the DC/DC converter 25.

Terminal P5 of the display CPU 11 is connected to a mode switch SWM, which selects a photographing modes, such as a programmed photographing mode, an automatic photographing mode, and a manual photographing mode. Terminal P6 is connected to a drive switch SWDr, which selects a drive mode, such as a single shot mode and continuous shot mode. Terminal P7 is connected to an exposure compensation switch SWXv which allows an exposure to be compensated. When one of the switches SWM, SWDr and SWXv connected to terminals P5, P6 and P7 are turned on, by operating an up-count switch SWUp connected to terminal P8 or a down-count switch SWDn which is connected to terminal P9, individual settings, changeable by the switches SWM, SWDr and SWXv can be changed.

A group of terminals $P_{SEG}$ serves to operate an LCD panel 12. When the lock switch SWL is turned on, the LCD panel 12 displays various photographing data necessary through the set of terminals $P_{SEG}$.

Terminal P10 of the display CPU 11 is connected to the body side contact Fmax1 32; terminal P11 to the body side contact Fmax2 33; terminal P12 to the body side contact Fmax3 34; terminal P13 to the body side contact Fmin1 35; terminal P14 to the body side contact Fmin2 36; terminal P15 to the body side contact A/M 37; terminal P16 to the body side contact Cont 38; terminal P17 to the body side contact Vdd 39; terminal P18 to a switch circuit 26.

In addition, the switch circuit 26 serves to switch between the body side contact $V_{BATT}$ 40 and the battery 22 by a H (high)/L (low) signal state of terminal P18. A body side contact Gnd 41 is connected to a ground of the battery 22 along with terminal Gnd of the display CPU 11.

A body side contact Gnd 41 is electrically connected to the mount ring 30.

The display CPU 11 and the main CPU 10 transfer data between each other comprising 8-bit command codes, as listed in TABLE 1, through a serial clock terminal SCK, serial-in terminal SI, and serial-out terminal SO.

In TABLE 1, codes 0 to 3, which are outputted from the display CPU 11 to the main CPU 10, are set depending on the conditions of switches provided on the new body, and data of the lens ROM and lens CPU. Codes 4 to 7 are data being inputted to the display CPU from the main CPU and are set in accordance with measured data by a photometer, a object distance measuring device, and so forth under control of the main CPU 10.

A group of PA contacts of the main CPU 10 is connected to an A/D circuit 15 for photometry; a group of PB contacts to an exposure control circuit 16; a group of PC contacts to the CCD process circuit 18; a group of PD contacts to the AF motor control circuit; 20 a group of PE contacts to the AF pulser 21; and a group of PF contacts to the Dx input circuit 13. In addition, the A/D circuit 15 is connected to an light receiver 14; the CCD process circuit 18 to the AF CCD 17; the AF motor control circuit 20 to the AF motor 19 in the camera body, as described above.

Terminal P20 of the main CPU 10 is connected to a first AF switch, $SW_{AF1}$, which switches between an automatic mode and which drive a focusing operation by the AF motor 19, and a manual mode, where the user manually performs the focusing operation. Terminal P21 is connected to a second AF switch, $SW_{AF2}$, which switches between a focusing priority mode and a release priority mode for a shutter release operation. The first AF switch $SW_{AF1}$ is mechanically interlocked with the second AF switch so that when the first AF switch is placed in the manual mode, the second AF switch $SW_{AF1}$ is set to the release priority mode.

ELECTRIC CIRCUIT OF NEW LENS

Figure 7:
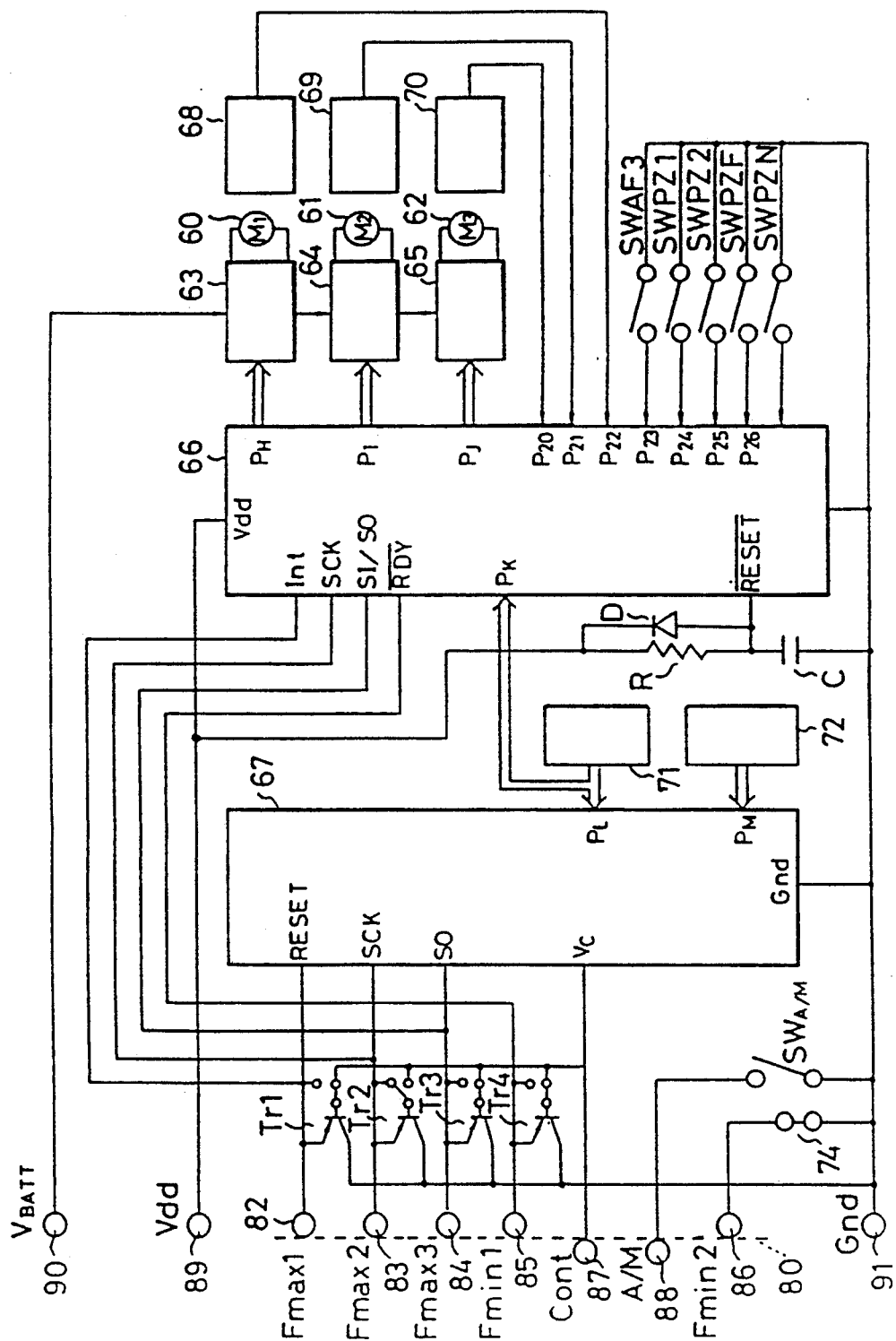
FIG. 7 shows a circuit diagram of the new lens.

FIG. 7 shows a circuit of the new lens 2. The lens side contact $V_{BATT}$ 90 is connected to motor drive sections 63, 64 and 65. By switching among these drive sections 63, 64 and 65, power is directly supplied to the motors 60, 61 or 62 through the contact $V_{BATT}$ 90 from the battery 22 in the camera body. The motor drive sections 63, 64 and 65 are connected to terminals PH, PI and PJ of the lens CPU 66, respectively, so as to control them. Pulsers 68, 69 and 70 are connected to terminals P20, P21 and P22, respectively, thereby determining the driving amount of each motor being detected, which is inputted to the lens CPU 66.

The lens side contact Vdd 89 supplies power from the body side display CPU 11 to terminal Vdd of the lens CPU 66, and a reset circuit, comprising resistor R, diode D and capacitor C.

The reset circuit has a specific time constant determined by the resistor R and capacitor C. When the power supply voltage has stabilized after Vdd is applied and a specific time period corresponding to the time constant elapses, the reset circuit causes the signal state at terminal RESET of the lens CPU 66 to changed from active (L) to inactive (H) and the program of the lens CPU 66 to be started.

The lens CPU 66 controls each motor driving section in the lens in accordance with information sent from the lens ROM 60 that is transferred from the body and transfers set data to the camera body. Data, listed in TABLE 2, is set in a RAM section of the lens CPU 66, which functions as a third information transfer means. Addresses 0 to 3 of the lens CPU 66 are set by the lens CPU 66 with the state of the lens side switches, data of lens ROM, and input data from the pulsers. Addresses 4 to 7 are set in accordance with data being inputted from the body side main CPU 10 through the display CPU 11.

In addition, addresses 1 to 4 of the lens CPU 66 are an area which stores data for determining the number of drive pulses (K value, Kval) for a focusing lens per image surface moving unit which varies depending on the focal length. This data is computed by data of the lens ROM 67 and outputted from the PZ pulser and zoom code plate.

In conventional zoom lenses, Kval is determined by length data of a zoom code range in a lens ROM which is addressed by the zoom code plate. In the new lens 2, the area of the same zoom code range can be divided into more smaller steps to generate more by PZ pulses which are outputted from the PZ pulsers than the conventional zoom lenses do, thereby effecting a more precise AF control.

Terminals P23 to P27 of the lens CPU 23 are provided on the lens; terminal P23 is connected to a third AF switch $SW_{AF3}$, which switches between an automatic mode and a manual mode of the auto focus operation; terminal P24 to a zoom selection switch $SW_{PZ1}$, which selects between a motor drive mode and a manual mode of the zooming operation; terminal P25 to an image magnification switch $SW_{PZ2}$, which serves to automatically perform the zooming operation depending on a relative movement to a subject so as to keep the image magnification thereof constant; terminal P26 to a Far side zoom switch $SW_{PZF}$, which causes the PZ motor 69 to move the photographic lens in the direction where the focal length thereof increases; terminal P27 to a near side power zoom switch $SW_{PZN}$ which causes the PZ motor 69 to move the lens in the direction where the focal length thereof decreases.

The lens CPU 66 includes a terminal INT wherein electric signals interrupt an execution of a software program; terminal SCK where a serial clock from the body side display CPU 11 is inputted; terminal SI/SO which transfers serial data; and terminal $\overline{RDY}$ which synchronizes a serial communication of the lens CPU 66 with peripheral devices.

The terminal INT allows an interrupt of the lens CPU 66 to be enabled when the signal state thereof is changed from L to H after the reset operation. When the serial communication is enabled, the signal state of terminal $\overline{RDY}$ is changed to L and the communication enable state is informed to the camera body display CPU 11.

In addition, the zoom code plate 71 is connected to terminals PK of the lens CPU 66 and terminals PL of the lens ROM 67. The distance code plate 72 is connected to set of terminals PM of the lens ROM, whereby focal length information and object distance information corresponding to the actual lens conditions are input.

The lens ROM 67 stores information intrinsic to the photographic lens, such as a minimum F number, maximum F number, and amount of change of F number caused by the zooming operation. The lens ROM 67 outputs data under control of the lens CPU 66 or camera body CPU 10. As described in the example, the high order addresses of the lens ROM are assigned in accordance with the zoom code detected from the zoom code plate. On the other hand, the low order addresses are assigned by counting clock pulses inputted from terminal SCK.

The lens ROM 67 structures a second information transfer means.

The lens side Fmax1 contact 82 is connected to terminal RESET of the lens ROM 67 and terminal INT of the lens CPU 66. The lens side contact Fmax2 83 is connected to the lens ROM 67 and terminal SCK of the lens CPU 66. The lens side contact Fmax3 84 is connected to terminal SO of the lens ROM 67 and terminal SI/SO of the lens CPU 66. The lens side contact Fmin1 85 is connected to terminal RDY of the lens CPU 66.

Contacts 82 to 85 are also connected to the emitters of PNP transistors Tr1 to Tr4. The bases of the PNP transistors Tr1 to Tr4 are selectively connected to contact Cont 87 or the emitter of the respective transfer through a fuse terminal (not labelled, see FIG. 7). The collectors of the PNP transistors Tr1 to Tr4 are connected to a contact Gnd. It is also possible to provide the fuses between the emitters and the contacts 82 to 85.

While a voltage is applied to each contact 82 to 85, when the potential of the contact Cont 87 equals that of the contact Gnd, each transistor is turned on, so that the contacts Fmax1, Fmax3, and Fmin1 which are in the connection state go L (low level) and the contact Fmax2 which is in the no-connection state goes H (high level). In other words, it functions as one memory cell of a ROM provided to each contact 82 to 85. Therefore, by connecting the fuse which is connected to the base of each transistor to the contact Cont 87 or emitter, one bit of information can be stored to each contact 82 to 85. It is also possible to provide these transistors in the lens ROM 67.

The lens side contact Cont 87 is connected to terminal Vc of the lens ROM 67 which supplies electrical power to the lens ROM 67 from camera body. When the power is supplied, the lens ROM functions.

The lens side contact A/M 88 is connected to a line with a ground potential connected to the lens side contact Gnd 91 through a diaphragm changing switch SWA/M, which is switched between an automatic mode and a manual mode of the operation by turning the diaphragm ring on the lens.

The lens side contact Fmin2 86 is grounded through a fuse 74 as a fixed information section which is the same as that provided in a conventional AE lens, described below. Depending on whether the fuse is present or absent, one bit of fixed information is transferred to the camera body. The lens side contact Fmin2 86, contact Fmax1 82 to Fmax3 84, and contact Fmin1 85 provide data as listed in TABLES 9 to 11, which structure a first information transfer means.

The lens side contact Gnd 91 is electrically connected to the mount ring 80. When the lens is mounted on the camera, the contact 91 is electrically connected to the mount ring 30 of the body.

COMBINATION OF NEW SYSTEM AND CONVENTIONAL SYSTEM

Combinations of the new camera lens, new body, conventional type lens, and conventional type body are described below.

Figure 8:
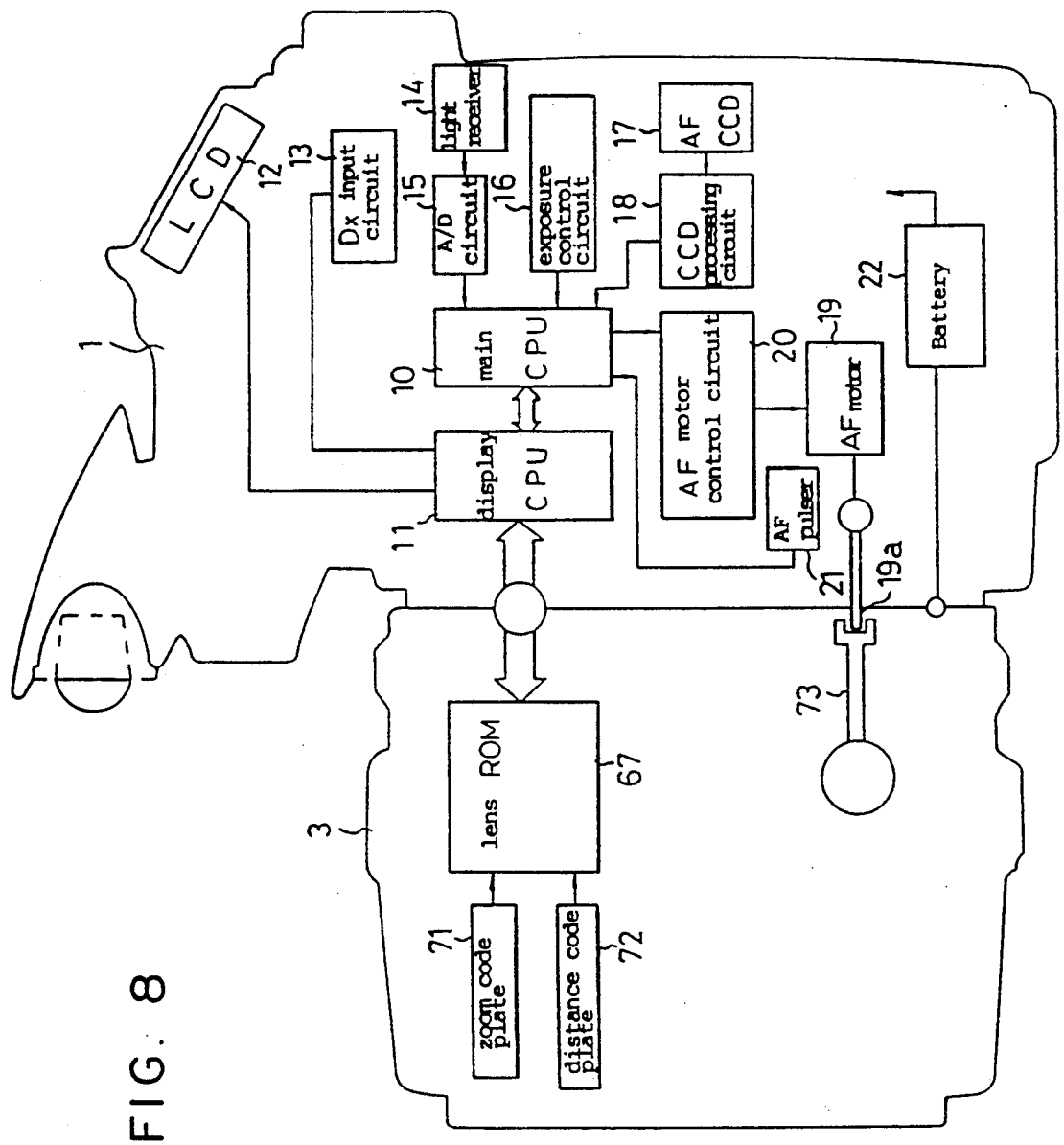
FIG. 8 shows a block diagram representing a combination of the new camera body and a conventional AEAF lens.

FIG. 8 illustrates a block diagram wherein an AEAF (Auto Exposure Auto Focus) lens 3 which provides a conventional auto focus function is mounted on the new camera body 1.

The AEAF lens 3 provides a lens ROM 67 and an AF coupler 73 which drives a lens for the focusing operation by the AF motor 19 in the camera body.

Figure 9:
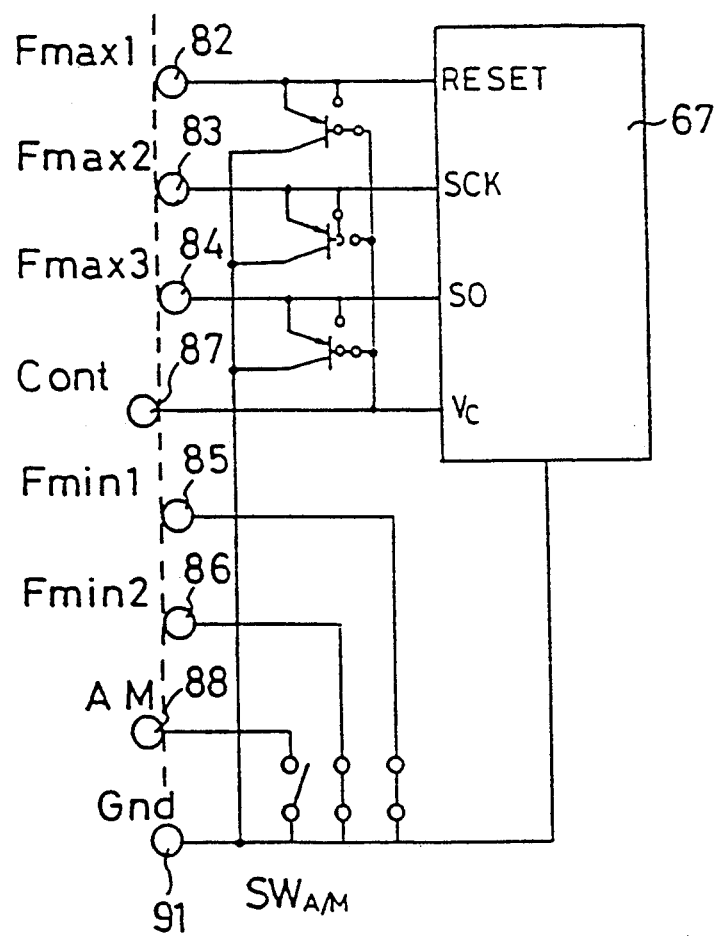
FIG. 9 shows a circuit diagram representing the conventional AEAF lens; shown in FIG. 8

In addition, as shown in FIG. 9, the AEAF lens 3 provides lens side contacts Fmax1 82 to Fmax3 84, which transfer a minimum F number as a 3-bit information when a terminal Cont 87 is grounded; a first information transfer means consisting of contacts Fmin1 85 and Fmin2 86 which transfer a maximum F number as a 2-bit information; and a second information transfer means including the lens ROM 67 which can read data by the new body or the conventional type AEAF body CPU with the AEAF function. The arrangement of the contacts is shown in FIG. 10.

When the AEAF lens 3 is mounted on the new body 1, except for two contacts of the new body 1, namely, contact Vdd 39 and contact $V_{BATT}$ 40, the corresponding contacts of lens side and body side are connected to each other, and the camera body can receive the second information that the lens ROM stores.

A conventional AEAF body equipped with an auto focus function and auto exposure function does not provide the Vdd and $V_{BATT}$ of the contacts, as shown in FIG. 11, unlike the new body. Since the AEAF body is the same as the new body at least in the electric circuit diagram except that the former camera body does not need the switch circuit connected to the $V_{BATT}$ contact, the drawing of the AEAF body is omitted.

When the new lens 2 is mounted on the conventional AEAF body, the body does not provide the Vdd contact and $V_{BATT}$ contact, and the lens CPU and each motor driving section in the lens do not function. However, because the AF coupler of the body is connected to that of the lens, the same operations as the conventional AEAF system can be performed. In addition, data of the lens ROM can be transferred to the body.

Figure 12:
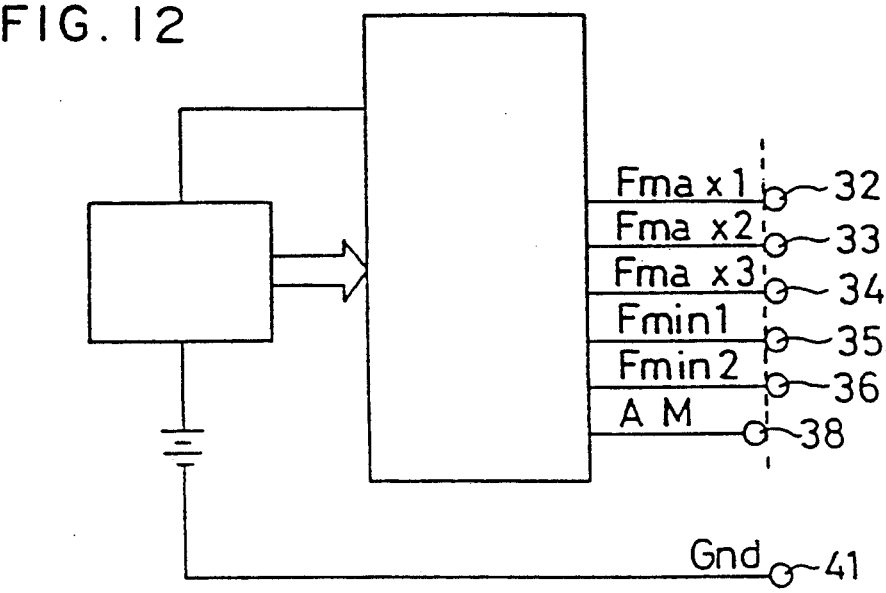
FIG. 12 shows a descriptive diagram of a conventional AE camera body.

FIG. 12 is a circuit diagram of a conventional AE body which provides only an AE function. This AE body provides the contacts Fmax1 32 to Fmax3 34, contacts Fmin1 35 and Fmin2 36, and contact A/M 38. When the new lens 2 is mounted on such an AE body, a contact Cont, which is protrudes from the mount ring of the body touches a mount ring of the body. Thus, the electrical potential of the contact Cont 87 is equal to that of ground. When a voltage is applied to each contact, the contacts Fmax1, Fmax3, and Fmin2 go L and the contact Fmax2 goes H, thereby information of minimum F value $F_{NO}=2.0$ and maximum $F_{NO}=22$ listed in TABLES 9 and 10 are provided.

Figure 13:
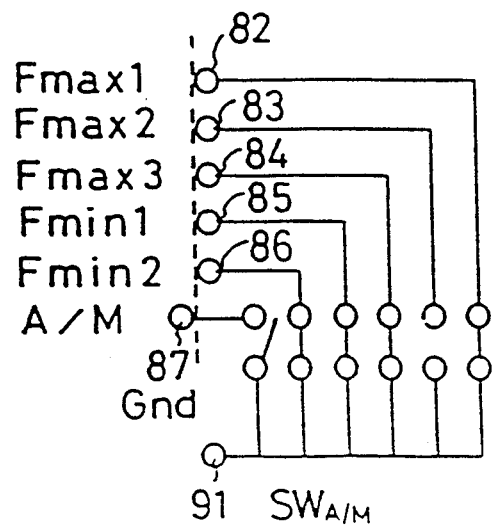
FIG. 13 shows a descriptive diagram of a conventional AE lens.

FIG. 13 shows a circuit of an AE lens which only provides the AE function. In this lens, each contact provides one bit of information. Between contact A/M 87 and the ground potential, a diaphragm selection switch SWA/M is connected. To other contacts, fuses (not labelled) which provide fixed information are provided. When this AE lens is mounted on the new body 1, a minimum F number, a maximum F number, and information relating to switching between an automatic mode and a manual mode of a diaphragm operation are transferred to the body through the contacts Fmax1 82 to Fmax3 84, Fmin1 85, Fmin2 86 and A/M 88.

FLOWCHART OF NEW SYSTEM

Referring to FIGS. 14 to 24, the operation of the new system, constructed as above, is described. In the following description, each program of the display CPU 11, main CPU 10, and lens CPU 66 is separately described.

Figure 14:
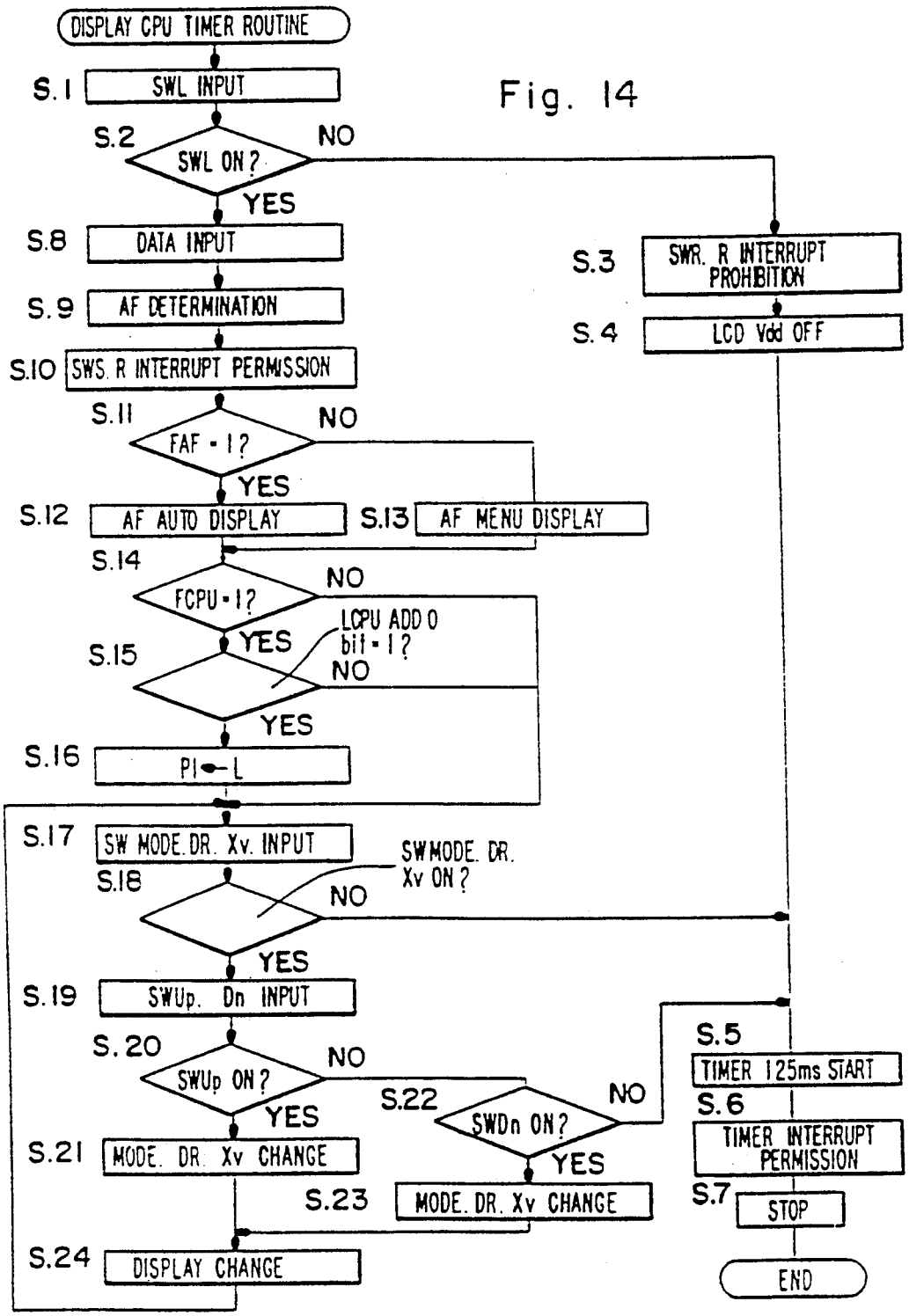
FIGS. 14, 15, and 17 to 19 show flowcharts representing operations of the display CPU of the new camera body.

FIG. 14 shows a timer routine of the display CPU 11.

The display CPU 11 detects whether the lock switch state is ON or OFF in steps 1 and 2 (termed S. 1 and S. 2, hereinafter and in the drawings). When the lock switch is turned OFF, a switch interrupt is prohibited and turns off the power of the LCD panel 12 in S. 3 and S. 4; and waits until the lock switch SWL is turned ON while performing the timer routine in a period of 125 ms in S. 5 to S. 6 of the timer process.

Figure 15:
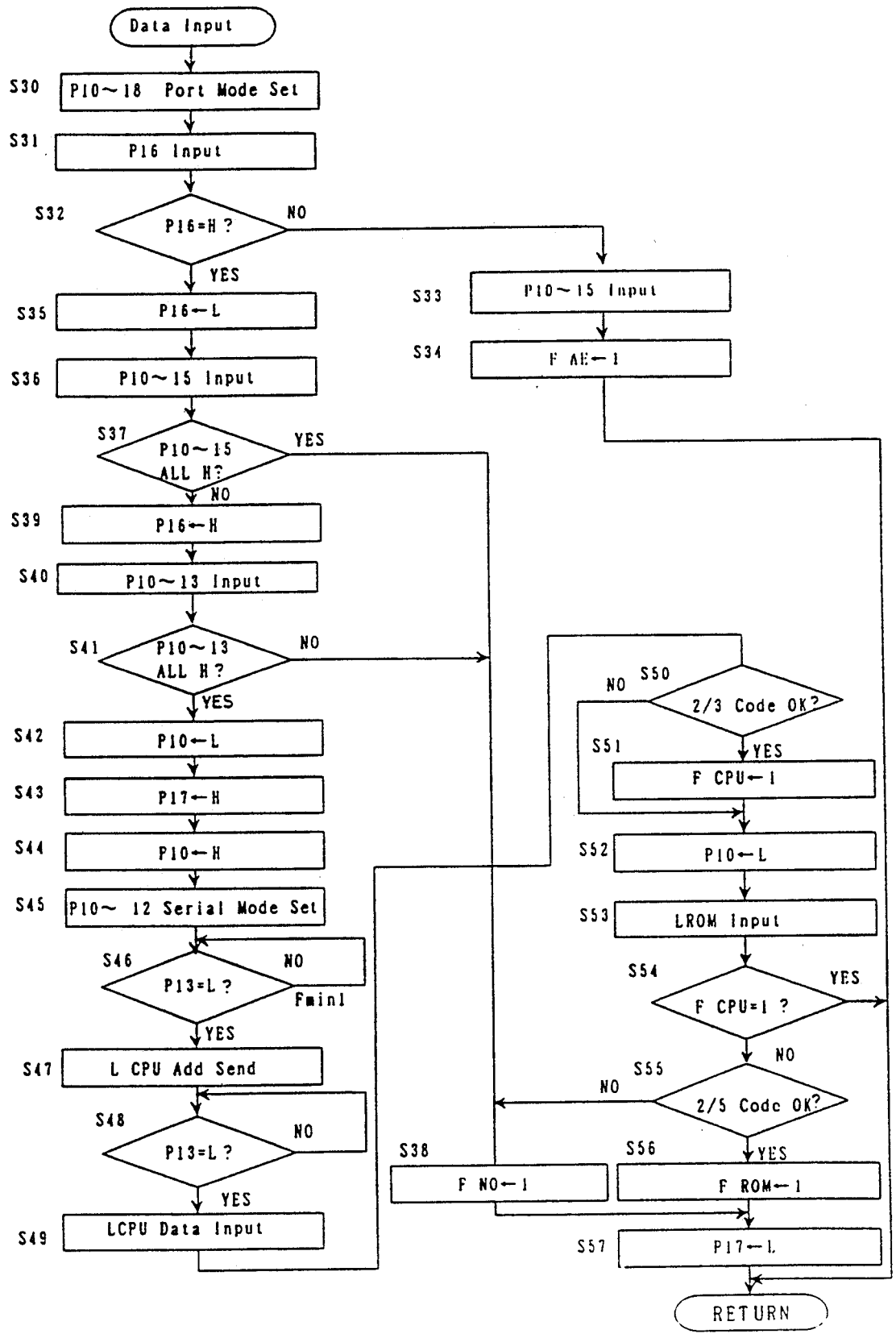
Figure 17:
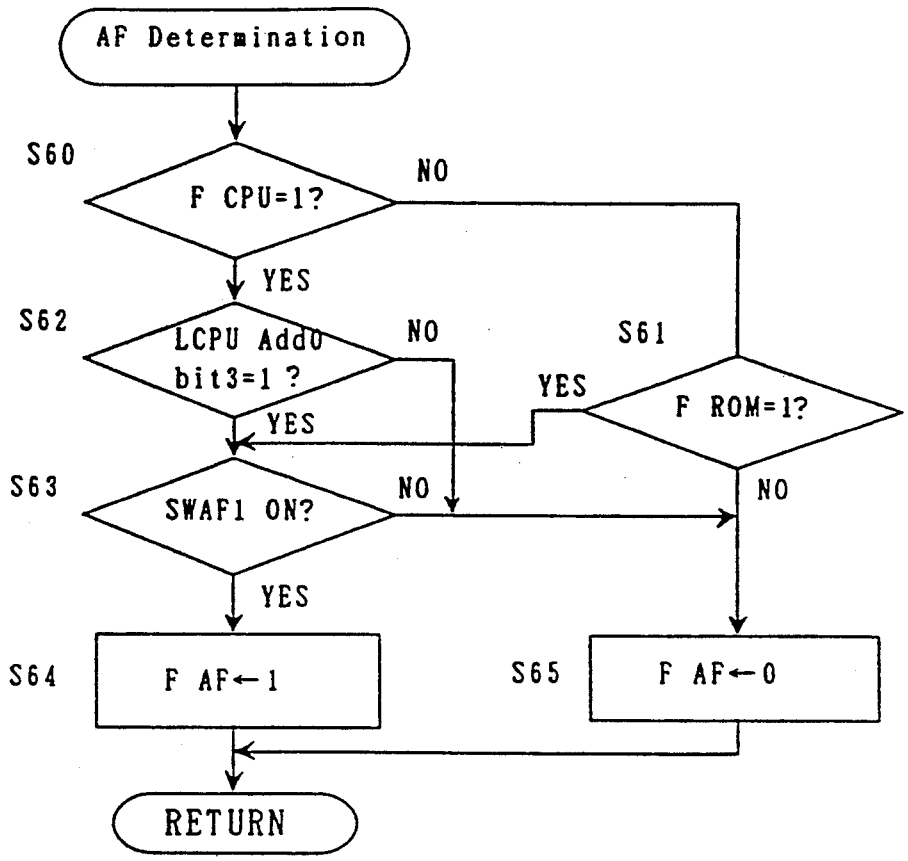

When the lock switch is turned ON, the display CPU 11 detects the type of lens being mounted by calling a data input subroutine shown in FIG. 15 in S. 8 and also detects whether the auto focus mode has been selected by calling an AF determination process shown in FIG. 17 in S. 9.

The data input subroutine causes each port which is used for communication with the lens to enter the input mode in S. 30 and detects the level of contact Cont 38 in S. 31 and S. 32. When the lens does not provide the contact Cont, namely, when the AE lens is mounted, since the contact Cont 37 of the body touches the mount ring, the ground level takes place (namely, L). Consequently, this subroutine reads the minimum F number, the maximum F number, and the stop A/M switching state as a 6-bit parallel data in S. 33, sets flag $F_{AE}$, which represents that the lens being mounted is an AE lens in S. 34, and returns to the timer routine.

When contact Cont is high (H) level, the data input subroutine causes the signal level to be changed to the low (L) level in S. 35 and detects the signal levels of the other contact in S. 36 and S.37. When the signal levels of all the contacts being detected are high (H), this subroutine determines that the lens is not mounted, sets flag $F_{NO}$, which represents that the lens has not been mounted in S.38, and then returns to the timer subroutine.

The decision in S.37 is negated when the new lens, or an AEAF lens, has been mounted. Then, the signal level of contact Cont is changed to high (H) in S.39 and detects the signal level of the other contacts in are inputted S.40 and 41. When the signal levels of all the contacts being detected are not high (H), the data input routine determines that the lens CPU, the lens ROM or the lens is defective, sets flag $F_{NO}$ to 1, which represents that the lens has not be mounted in S.38, and returns to the timer routine.

When the data input routine determines that the signal levels of all the contacts are high in S.41, it means that a lens which has a lens CPU or lens ROM has been mounted. Thereafter power is supplied to the lens CPU in S.42 to S.44, the mode for the contacts Fmax1 to Fmax3 is changed from the port mode to the serial communication mode in S.45, and a wait occurs until the lens CPU becomes ready to communicate in S.46.

When the lens CPU becomes ready to communicate, this routine sends an address of the lens CPU in S.47 and after the lens CPU becomes ready to communicate again, it inputs data of the lens CPU in S.49. This routine detects the ∮ code of bits 5 to 7 of address 0 of the lens CPU at S.50 and when it is OK, sets flag $F_{CPU}$ to 1, which represents that the lens CPU is provided in S.51. The ∮ code is a code where 2 of 3 bits is set to "1" as listed in TABLE 3. This code serves to distinguish whether the lens being mounted has a lens CPU.

In S.52 and S.53, the routine causes the signal state of the contact Fmax1 to go low (L) and inputs data of the lens ROM. When $F_{CPU}$ is "1", processing returns to the display timer CPU routine. When $F_{CPU}$ is 0, the program detects the 2/5 code of bits 3 to 7 of address 0, and when it is OK, sets flag $F_{ROM}$ which represents that the lens is not mounted to 1. When it is not OK, flag $F_{NO}$, which represents that the lens is not mounted, is set to 1 before processing returns to the timer routine (S.54 to S.57).

Figure 16A:
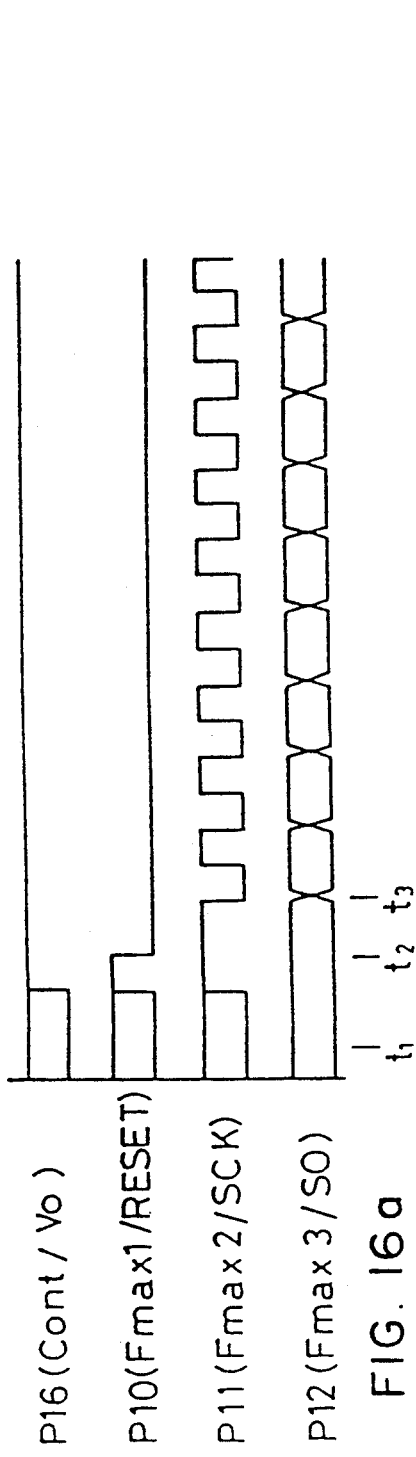
FIG. 16 shows a timing chart of the process of FIG. 15.

FIG. 16 shows a timing chart of the data input process described above, wherein FIG. 16(a) represents that the AEAF lens which has a lens ROM, is mounted. In this case, the routine detects the signal level of the contact Cont at t1 (S.31), changes the signal level of terminal P10 to L at t2 (S.52), and reads data of the lens ROM from t3 (S.53).

Figure 16B:
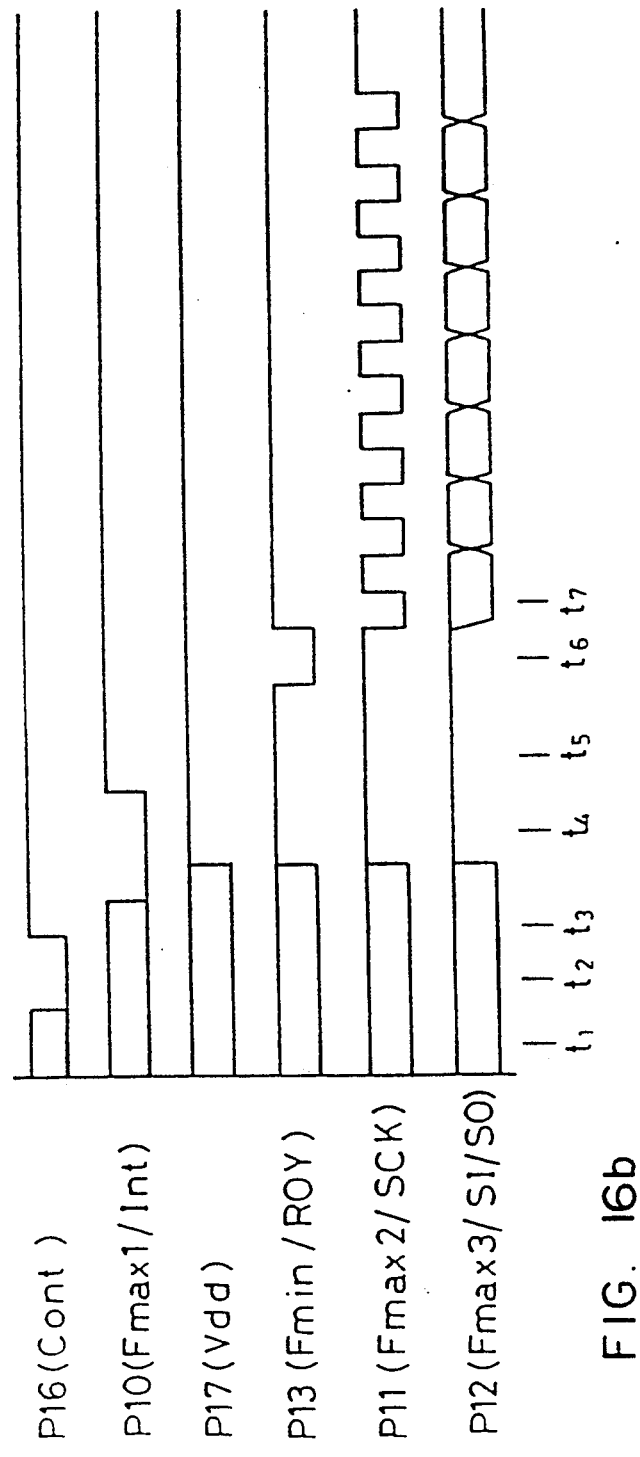

FIG. 16(b) shows a data input process with a new lens which provides the lens CPU. In this case, at t1 this process performs the same operation as the above subroutine does. However, at t2 the process changes the signal level of the contact Cont to low and inputs the signal level of each contact (S.36). When they are not all H at t3, the signal level of the contact Cont is changed to H (S.39). When all the signal levels of terminals P10 to P13 and P17 are H, the process changes the signal state of the contact Fmax1 to L, and the contact Vdd to H at t4 (S.42 and S.43). At t5, the signal level of the contact Fmax1 is changed to H (S.44). When the signal level of the contact Fmin1 is L t6 (S.46), a serial communication process is started at t7 (S.47).

FIG. 17 shows the AF determination subroutine which is called in S.9 of the timer subroutine. First, the subroutine determines which type of lens is mounted by a flag being set in the data input process described above and performs a process corresponding to the lens being mounted in S.60 and S.61. When the lens has a the lens CPU, the subroutine references address, 0 bit 3 of the lens CPU in S.62. This bit is set by the lens CPU when the third AF switch position is changed. When the switch position is "1", the subroutine further detects the switch state of the first AF switch of the body in S.63. When the state of both switches are ON, the subroutine sets flag $F_{AF}$ to 1 so as to indicate that the auto focus mode takes place in S.64. When the state of one of the switches is OFF, the subroutine clears the flag $F_{AF}$ so as to indicate that the manual focus mode takes place (S.65).

On the other hand, when the an AEAF lens which has a lens ROM is mounted, the first AF switch of the body determines whether the auto mode or manual mode takes place. When an AE lens, which does not have both a lens CPU and lens ROM is mounted, the manual focus mode is set.

After the process of the above, subroutine is completed, when returning back to the timer routine, the display CPU 11 permits a switch interrupt in S.10 and causes the LCD panel to indicate the AF set state corresponding to the flag state described above.

While a lens which provides a lens CPU is mounted, when the lens issues a power hold request in S.14 and S.15, the timer routine changes the signal state of P1 to L and starts the main CPU 10 at S.16.

In S.17 to S.24, when the mode switch, drive switch, exposure compensation switch, and up switch and down switch are provided and operated, a process which changes the operation mode and display indication thereof is conducted.

When such switches are not operated, the processes from S.5 to S.7 are conducted and the process ends.

Figure 18:
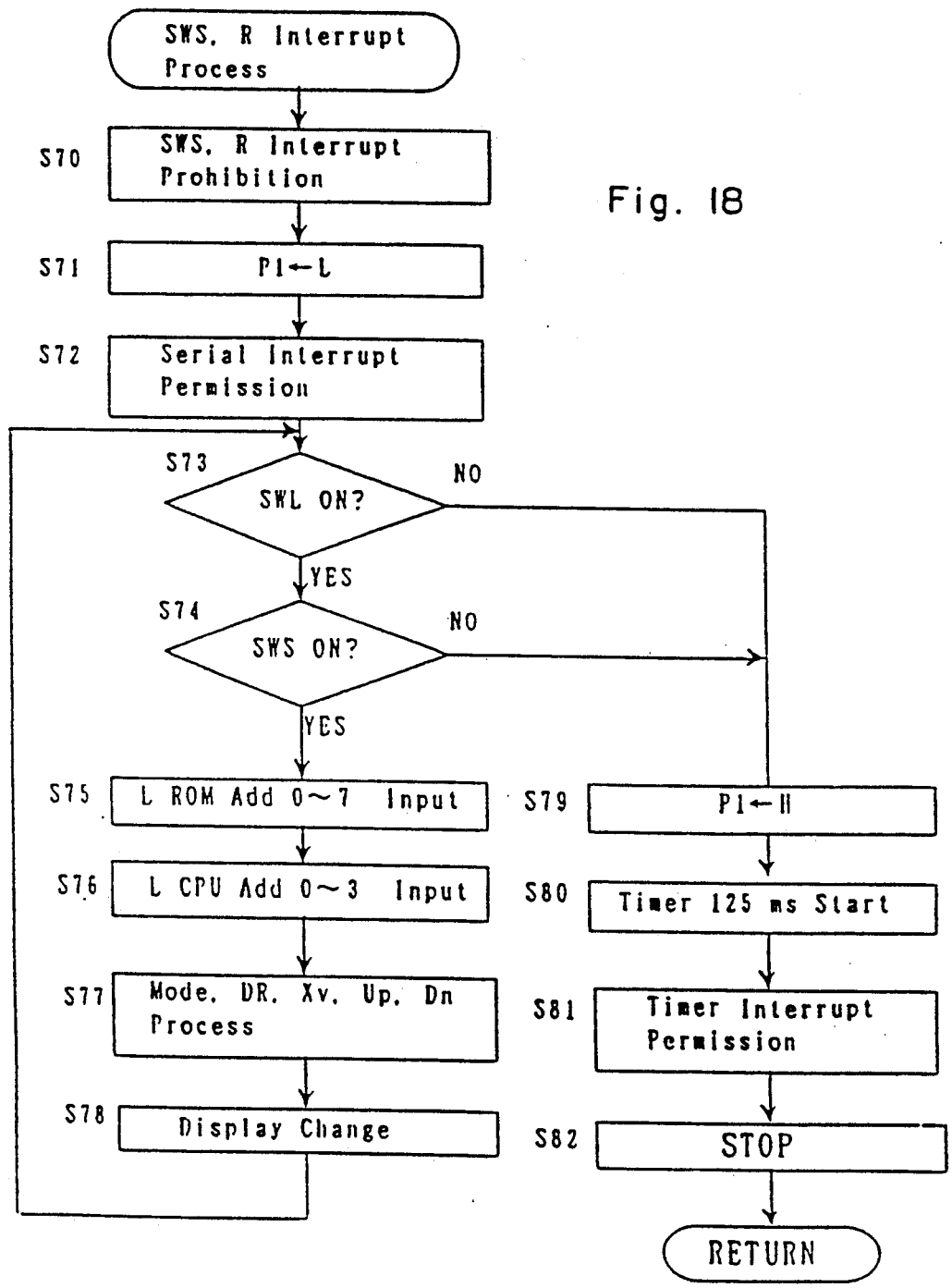

While the timer routine allows "SWS and R interrupt", when the photometry switch and release switch are turned on, an interrupt process shown in FIG. 18 is executed.

In the SWS and R interrupt process, the process prohibits a further SWS and R interrupt in S.70, turns on the power of the main CPU, and permits a serial interrupt subroutine in S.72.

Figure 19:
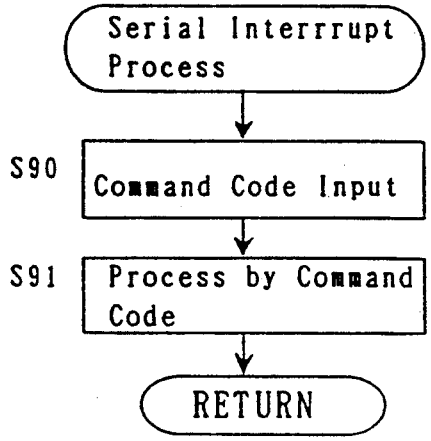

The serial interrupt subroutine comprises two steps, which are shown in FIG. 19. The first step perform a command input operation in S.90. Then, and a related process operation is performed in S.91. This subroutine serves to communicate with the main CPU in accordance with command codes listed in TABLE 1 so as to conduct a required process.

When the lock switch SWL and the photometry switch SWS are turned ON, the SWS and R interrupt process repeats the steps in S.73 to S.78, so as to input information that changes from time to time and to perform the set change process for the mode, the drive, and exposure compensation. These steps are the same as those conducted steps S.17 to 24 of in the timer routine.

When either the lock switch SWL or the photometry switch SWS is turned OFF, the interrupt process subroutine turns OFF the power to the main CPU, sets the timer, permits a timer interrupt, and executes the steps in S.79 to S.82.

Figure 20:
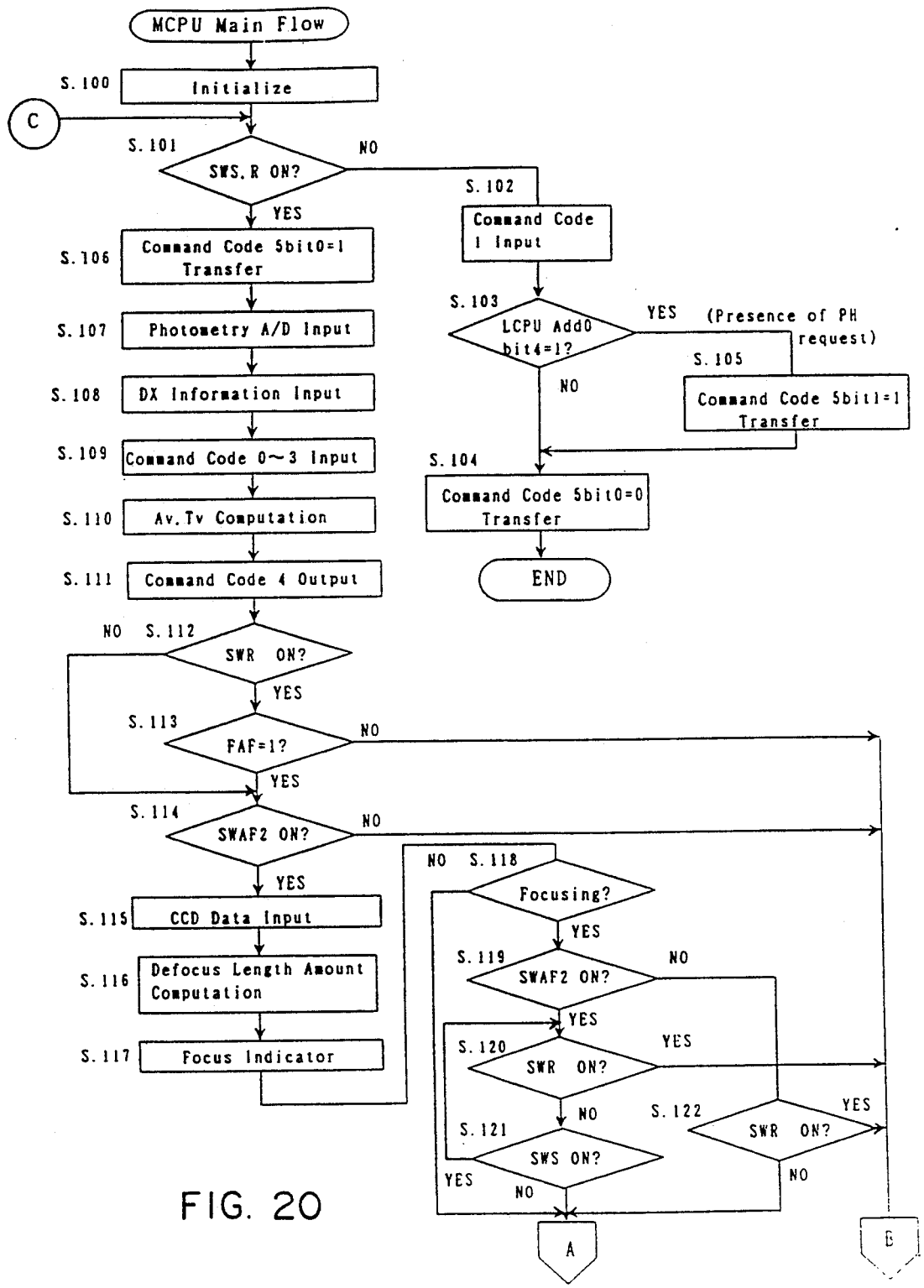
FIGS. 20 to 22 show flowcharts representing the operation of the main CPU of the new camera body.
Figure 21:
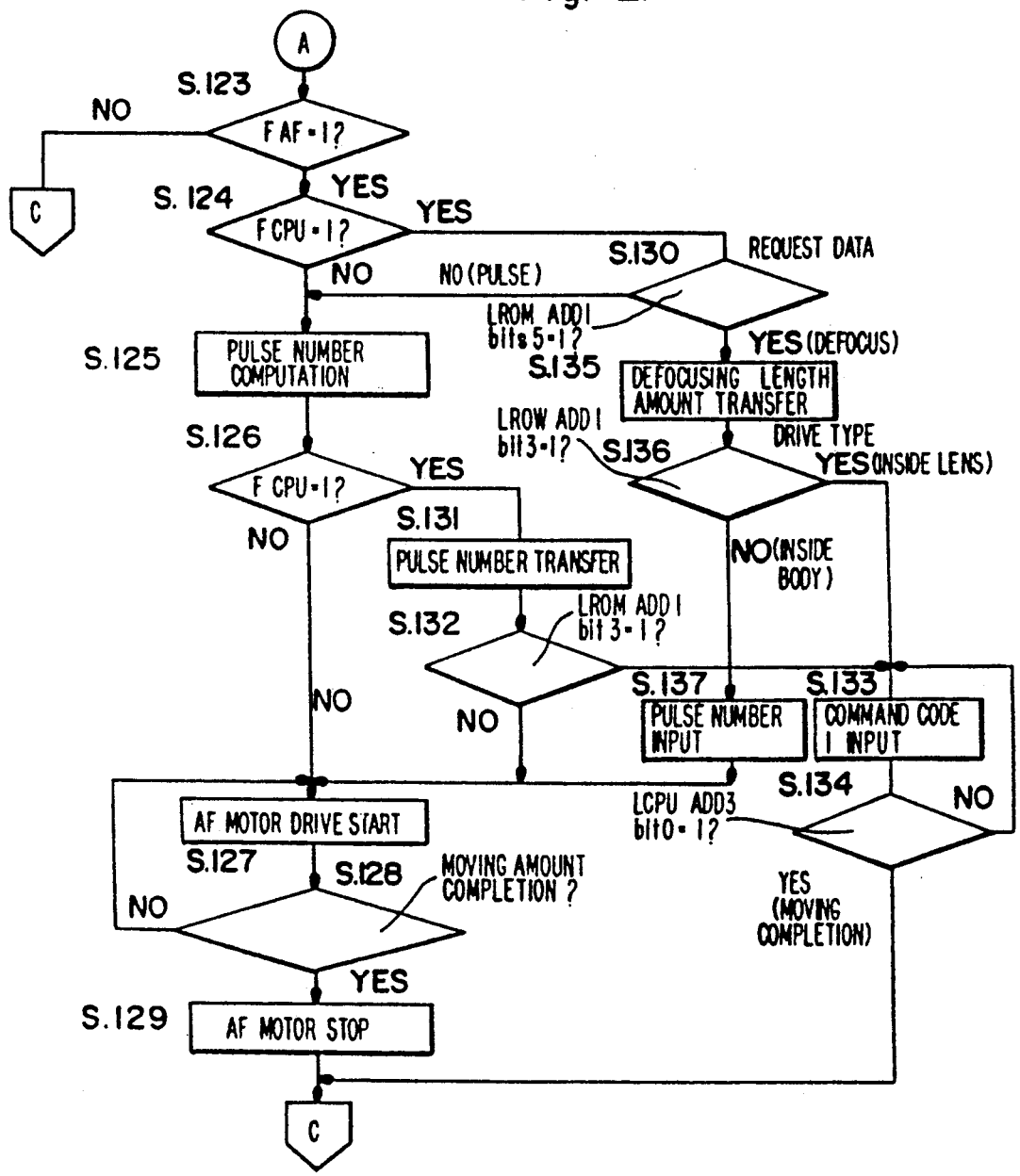
Figure 22:
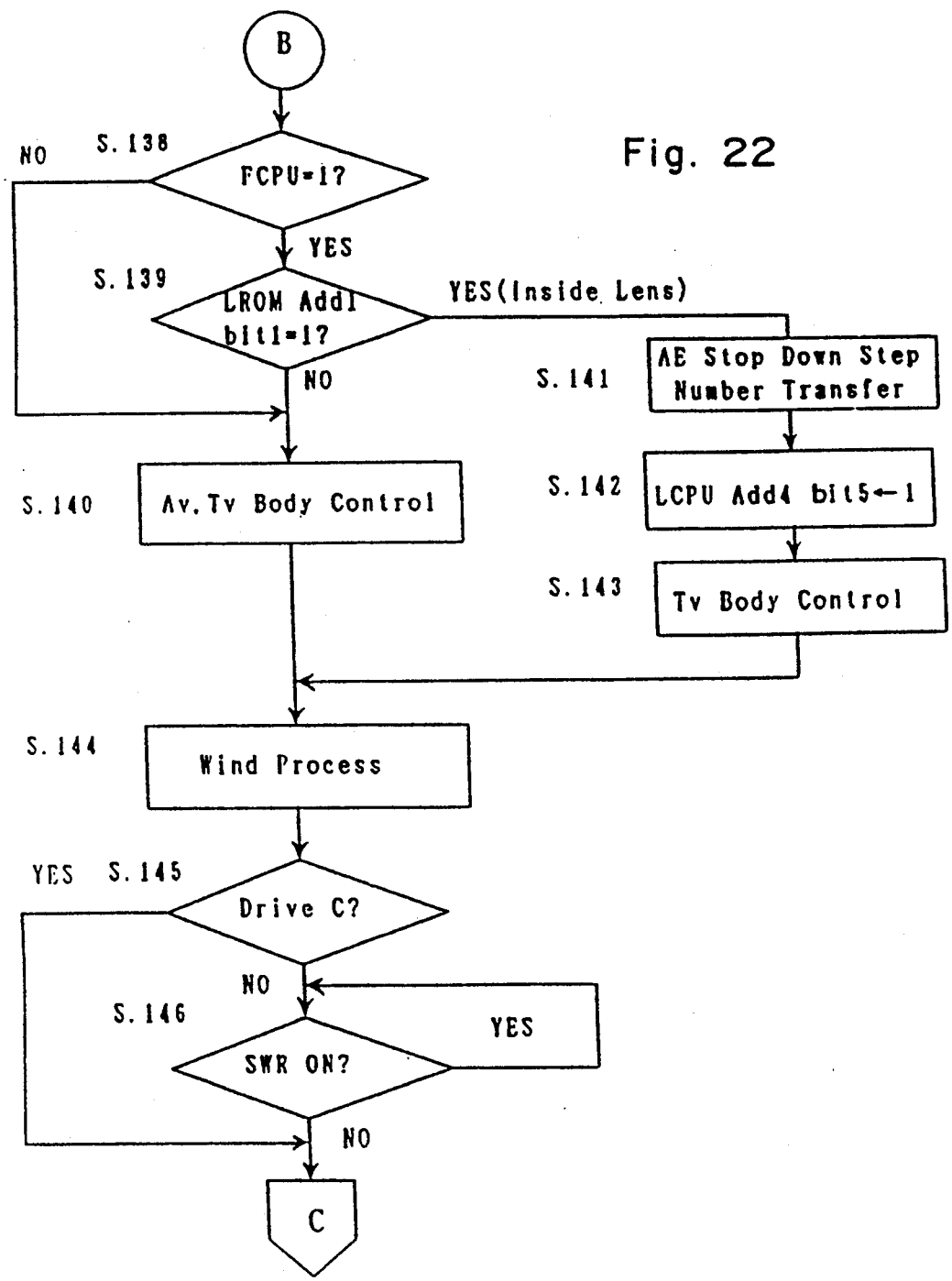

Referring to FIG. 20 to FIG. 22, the program installed in the main CPU 10 will be described.

When the DC/DC converter 25 is turned on and power of the main CPU is turned on, the main CPU is initialized in S.100 and a determination is made as to whether the photometry switch SWS or the release switch SWR is turned ON in S.101.

When switches, SWS and SWR are turned OFF, the program reads a command code "1" transferred from the display CPU 11 and determines whether the lens has issued a power hold request based upon the state of address 0, bit 4 of the lens CPU. When the lens does not issue the power hold request, the main CPU requests the display CPU 11 to turn off the power hold in S.104 and terminates the process. When the lens issues the power hold request, the program sets bit 1 of command code 5 to "1" and transfers it to the display CPU 11 in S.105. Consequently, the display CPU receives the data, sets P18 to H, turns on the switch circuit, and then turns ON the power $V_{BATT}$ of the motor driving section of the lens.

When the photometry switch SWS or the release switch SWR is turned on, the program transfers a command which requests the display CPU 11 to turn ON the power to the lens CPU. Photometry A/D, data is inputted, along with the DX code information, data provided by the lens, the shutter speed set by the body, and the diaphragm value from the display CPU in S.107 to S.109 so as to compute Tv (Time Value) and Av (Aperture Value) in S.110.

The main CPU 10 transfers the computed of Tv and Av information to the display CPU 11 so as to display them on the LCD panel 12.

The program determines whether the release switch SWR is turned ON in S.112. When While the relase switch is turned ON, and the AF is in the manual state or the release priority mode is performed, control advances to S.138, described below so as to conduct a release process. When the release switch SWR is turned OFF or when it is turned ON while the AF is in the auto mode and the focusing priority mode is performed, the program causes the distance measuring process to start.

The main CPU 10 computes the quantity of defocus by inputting CCD data, determining the focusing state from the data and indicates the result in the view finder in S.115 to S.117.

When a subject is not focused, the program advances from S.118 to S.123, to be described later so as to perform an AF process. When the amount of defocusing length is "0" in the focusing priority mode, the program performs a focus lock operation when the release switch SWR is turned ON while the photometry switch SWS is turned ON in S.120 and S.121.

In the release priority mode with the switch $SW_{AF2}$ is ON, when the release switch SWR is turned ON, the program advances from S.122 to S.138. When the release switch SWR is turned OFF, the program advances the process to "A" (S.123) rather than activating the release lock operation.

FIG. 21 illustrates an AF process of the main flow of the main CPU.

When focusing is in the manual mode, the program returns back to S.101 so as to continue the process rather than driving the lens (S.122). In the manual mode, the release priority mode automatically takes place. Thus, when the subject is not focused while the photometry switch SWS is turned ON and the release switch SWR is turned OFF, the program continuously executes the process in a loop until it determines that the release switch SWR is turned ON in S. 112. When the release switch SWR is turned ON, the program goes from S. 113 to S. 138 so as to perform the release process. When the object is focused by manually operating the lens, the program may exit from S. 119 and S. 122 to "B" S. 138.

When the focusing is in the auto mode, the program selects one of five lens drive methods depending on the performance of a CPU that mounted on the lens, as described below.

The first case (combination) is that a conventional AEAF lens, which provides a lens ROM is mounted. In this case, like the conventional method, the main CPU in the body computes drive pulses by the amount of defocusing length in S. 125 and the AF motor of the body drives the lens in S. 127 to S. 129.

The second and third cases (combinations) are that although a lens provides a lens CPU, its performance is not so high. In this case, the program advances from S. 130 to S. 125 so that the main CPU in the body computes the number of pulses depending on the amount of defocusing length. After that, the program selects whether to drive the focusing lens by a motor in the lens side or by a motor in the camera body side in S. 132.

In the second case, the AF motor in the body drives the focusing lens. Consequently, like the first case, the program performs the processes in S. 127 to S. 129.

In the third case, since the focusing lens is driven by a AF motor provided in the lens, the lens CPU drives the AF motor in accordance with the number of pulses transferred in S. 131. The main CPU waits until the lens movement completion information is transferred from the lens CPU in S. 133 and S. 134 and after that, the program advances to S. 101.

When the AF motor in the body drives the focusing lens, it is not necessary to transfer the number of pulses for AF to the lens. However, the program transfers the number of pulses to the lens CPU in S. 131, which computes the image magnification using the amount of moving length of the focusing lens for performing a constant image magnification control operation. The constant image magnification control operation varies the magnification of the lens so that the size of a subject image on a film is maintained constant. This operation is conducted in the manner that the program detects a change of the magnification by the amount of defocus after the subject, which has been focused, mores converting the change of magnification into a power zoom (PZ) motor drive pulses, and control the PZ motor.

The fourth and fifth cases (combinations) are that a very high performance lens is being mounted has to the camera body. In these cases, the lens CPU requests data of the amount of defocusing length. Even in the conventional system, although a program which compensates a non-linear characteristics between the amount of defocus and the amount of driving length of lens has been installed, the system reads compensation data in a lens ROM and causes a CPU in the body to compute the compensation. Consequently, the CPU should have a general purpose function. On the contrary, in the fourth and fifth cases, when the lens CPU converts the amount of defocus into pulses, even for a lens with much complicated linearity, suitable conversion can be performed, resulting in a more precise AF control operation than the conventional system.

In the fourth case, the program inputs the number of drive pulses computed by the lens CPU to the main CPU in S. 137, so as to drive the AF motor in the body.

In the fifth case, since the program drives the AF motor in the lens in accordance with drive pulses computed by the lens CPU, the main CPU waits until the lens moving operation is completed in S. 133 and S. 134; the program returns back to S. 101 and then continues the process.

FIG. 22 shows a release process of the main CPU main flow.

When the program advances from the main flow of the main CPU shown in FIG. 20 to step S. 138 shown in FIG. 22, only while a lens which does not provide a lens CPU is employed, the program controls the diaphragm and the shutter speed in the body so as to perform the exposure operation. When a lens which provides a lens CPU is employed, the program determines whether to perform the diaphragm control in the lens or from the body by data of the lens ROM. When the diaphragm control is performed in the lens, the program transfers the number of steps of the AE stop-down operation computed by the main CPU to the lens CPU, issues a stop-down start command and performs the exposure operation with the shutter speed controled by body side.

After the exposure operation is completed, the program causes the main CPU to drive the wind motor for winding the film in S. 144. When drive C, namely, the continuous shot mode takes place, the program immediately advances to S. 101, shown in FIG. 20 so as to continue the process. When the single shot mode takes place, the program waits until the release switch is turned OFF in S. 146 and returns back to S. 101

Figure 23:
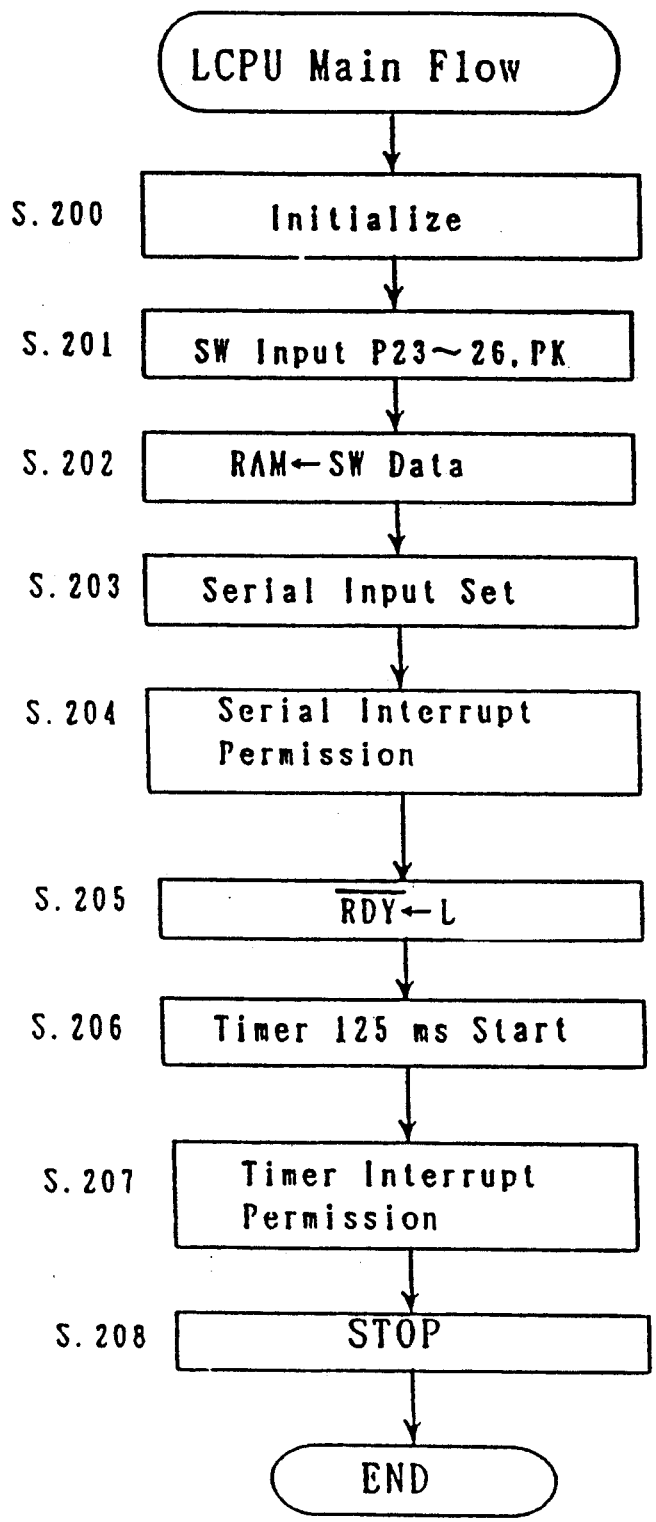
FIGS. 23 and 24 show flowcharts representing the operation of the lens CPU of the new lens.
Figure 24:
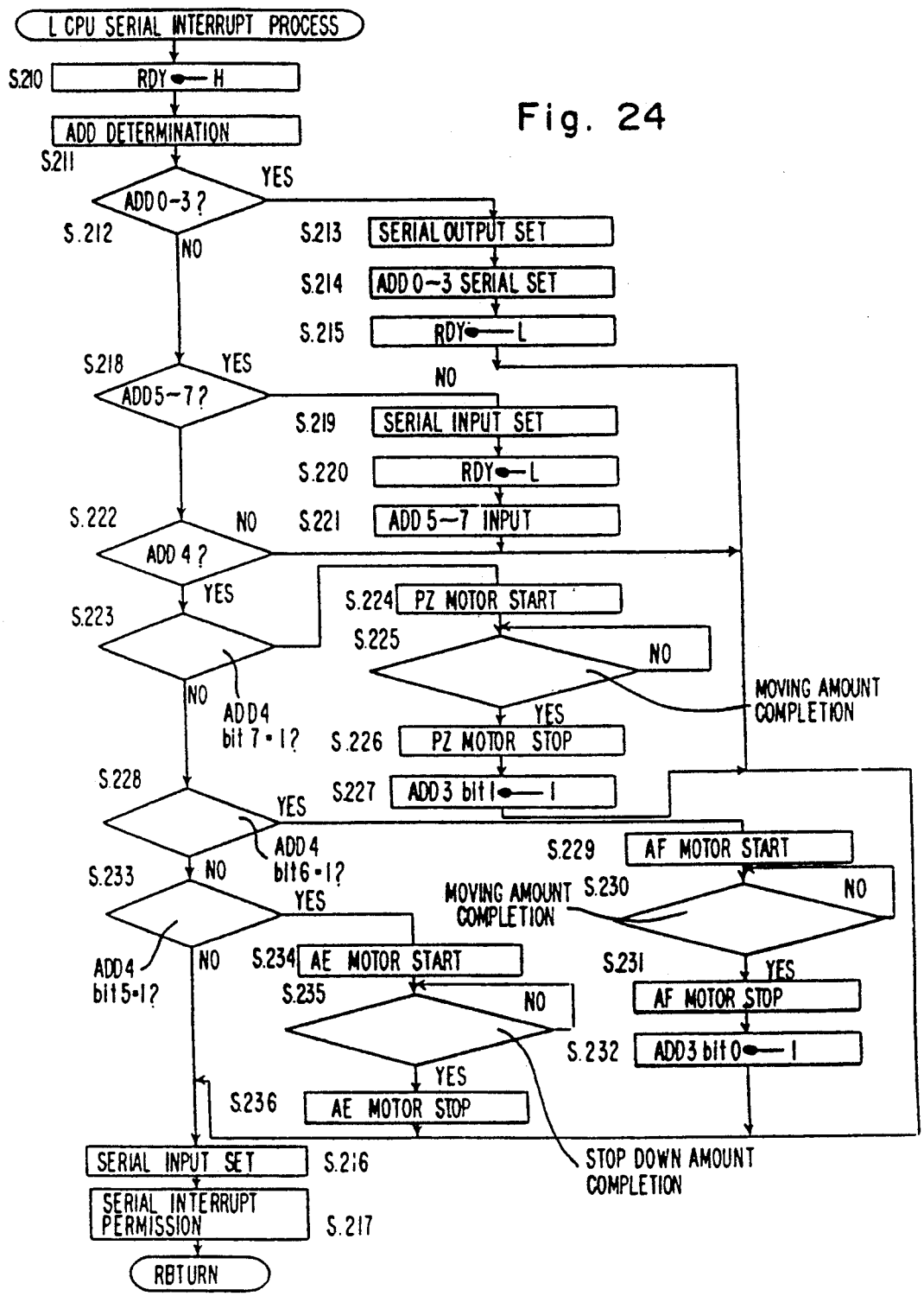

Referring to FIGS. 23 and 24, the operation of the lens CPU is described.

FIG. 23 is a main flowchart of the lens CPU. After the contact goes H by a command from the display CPU, the reset circuit operates and the reset operation is released, resulting in the activation of the lens CPU.

The program initializes the lens CPU in S. 200, reads the status of each switch and the zoom code plate provided in the lens in S. 201 and S. 202, and stores it in a RAM.

The program sets the terminal SI/SO to the serial input mode in S. 203 to S. 205, so as to permit a serial interrupt and sets the contact RDY (not RDY) to L, as to inform the display CPU that the serial communication is enabled.

The program sets a timer so as to continue this process at an interval of 125 ms in S. 206 to S. 208 and completes the process one time.

FIG. 24 shows a flowchart of the serial interrupt process of the lens CPU which is executed when a serial interrupt from the display CPU of the camera body occurs.

The program sets the signal level of the contact RDY to H in S. 210, which informs the display CPU that the serial communication is disabled, determines which address of the lens CPU in TABLE 2 accords with the signal being transferred from the display CPU and executes the process corresponding to the address in S. 211.

When the program determines that the signal accords with Address 0 to 3, it outputs this data in serial in S. 213 and S. 214. This data is set by the lens CPU in accordance with the setting of the switches and data of the lens ROM. After the data is outputted, the program sets the signal level of the contact RDY to L, changes the port which was changed to the output mode in S. 216 and S. 217 to the input mode, permits a serial interrupt, and returns back to the main flow so as to continue the process.

When the program determines that the signal accords with Address 5 to 7, it changes the contact SI/SO to the input mode in S. 219 and S. 220 so as to represent that the communication is enabled, inputs data in S. 231, and advances to S. 216. This data is transferred to the lens CPU from the main CPU through the display CPU.

When the program determines that the signal does not accord with Address 0 to 3, and Address 5 to 7 and Address which is not Add 4, namely Add 1 to 4 or an address which is not permitted is specified, it advances to S. 216 where no practical process is conducted before returning back to the main flow.

When data transferred from the display CPU accords with Address 4 of the lens CPU, a process in accordance with the bit is conducted. When bit 7 is "1", the program drives the PZ motor to perform the zooming operation and sets the moving completion bit in S. 224 to S. 227. When bit 6 is "1", the program drives the AF motor for performing the focusing operation and sets the moving completion bit in S. 229 to S. 232. When bit 5 is "1", the program drives the AE motor for performing the stop-down operation.

After the process of each motor is completed, the program advances to S. 216 and S. 217 before returning to the main flow so as to perform the process.

The operations of the three CPUs included in the new system have now been described.

As described above, the camera system of the present invention determines which type of lens is mounted on a camera body and inputs three kinds of data depending on the performance of the lens. Conversely, the lens supplies three steps of information depending on the performance of the camera body.

In addition, when a new camera body and new lens (both of which relate to the present invention) are combined, by connecting the control means of the body and that of the lens, more precise information can be transferred than conventional camera systems. For example, a more precise AF control operation is available.

TABLE 1

(Command Codes)

| Code | bit 7 | 6 | 5 | 4 | 3 | 2 | 1 | 0 |
|---|---|---|---|---|---|---|---|---|
| 0 | Mode | | Drive | | Exposure compensation | | | |
| 1 | Lens CPU | | | Add 0 to 3 | | | | |
| 2 | Lens ROM | | | Add 0 to 7 | | | | |
| 3 | Tv being set | | | | Av being set | | | |
| 4 | Tv to be displayed | | | | Av to be displayed | | | |
| 5 | ISO | | | | | $V_{Batt}$ ON | PH request | |
| 6 | Number of film shots | | | | Winding information | | | |
| 7 | Lens CPU | | | Add 4 to 7 | | | | |

TABLE 2

(L-CPU)

| Address | 7 | 6 | 5 | 4 | 3 | 2 | 1 | 0 |
|---|---|---|---|---|---|---|---|---|
| 0 | | ½ code | | PH request | AF A/M | PZ A/M | | Lens O/C |
| 1 | Short focal length data | | | | | | | |
| 2 | Long focal length data | | | | | | | |
| 3 | Sf end | Lf end | AF N end | AF F end | PZ F | PZ S | PZ move complete | AF move complete |
| 4 | PZ start | AF start | AE stop-down | | | | | |
| 5 | Amount of focal length (number of pulses) | | | | | | | |
| 6 | Amount of defocusing length (number of pulses) | | | | | | | |
| 7 | Number of stop-down steps (number of pulses) | | | | | | | |
| 01 | Number of start pulses in zoom code plate range | | | | | | | Ph |
| 02 | Pulse width in zoom code plate range | | | | | | | Pw |
| 03 | Start Kval | | | | | | | Ka |
| 04 | Kval calibration coefficient | | | | | | | Kc |

TABLE 3

| | Add 0 ½ code | | | |
|---|---|---|---|---|
| bit | 7 | 6 | 5 | |
| | 1 | 1 | 0 | RAM ver. 1 |
| | 1 | 0 | 1 | RAM ver. 2 |
| | 0 | 1 | 1 | RAM ver. 3 |

TABLE 4

(L-ROM)

| Add | bit 7 | 6 | 5 | 4 | 3 | 2 | 1 | 0 |
|---|---|---|---|---|---|---|---|---|
| 0 | | | | 2/5 code | | | | |
| 1 | | | | Lens data | | | | |
| 2 | | | | Kvalue data | | | | |
| 3 | | | | AF compensation amount data | | | | |
| 4 | Release Av | | | | | | Minimum Av | |
| 5 | | | | Exposure compensation amount data | | | | |
| 6 | | | | Focal length data | | | | |
| 7 | | | | Distance code data | | | | |

TABLE 5

| | | Add 0 bit | | | |
|---|---|---|---|---|---|
| 7 | 6 | 5 | 4 | 3 | 2/5 code |
| 0 | 0 | 0 | 1 | 1 | Single lens |
| 0 | 0 | 1 | 0 | 1 | Zoom lens |
| 0 | 0 | 1 | 1 | 0 | Macro lens |

TABLE 6

| | Add 0 bit 2,1 | |
|---|---|---|
| bit | bit | |
| 0 | 0 | ROM ver. 1 |
| 0 | 1 | ROM ver. 2 |
| 1 | 0 | ROM ver. 3 |
| 1 | 1 | ROM ver. 4 |

TABLE 7

| | Add 0 bit 0 |
|---|---|
| 0 | Input mode |
| 1 | Input/output mode |

TABLE 8

| bit | Add 2 |
|---|---|
| 0 | AF presence/absence |
| 1 | AE presence/absence |
| 2 | PZ presence/absence |
| 3 | AF drive type |

TABLE 8-continued

| bit | Add 2 |
|---|---|
| 4 | AF data request |
| 5 | Pulse request |
| 6 | Defocus request |
| 7 | AE drive type |

TABLE 9

| $F_{NO}$ | Minimum $F_{NO}$ information Fmin | | |
|---|---|---|---|
| | 3 | 2 | 1 |
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

TABLE 10

| $F_{NO}$ | Maximum $F_{NO}$ information Fmax | |
|---|---|---|
| | 2 | 1 |
| 22 | 0 | 0 |
| 32 | 0 | 1 |
| 45 | 1 | 0 |

TABLE 11

| A/M | 0 | 0 |
|---|---|---|
| Lens | Auto | Manu |

We claim:

1. A photographic lens that is selectively mountable to a camera body, comprising:
   a group of electrical contacts that are selectively connectable with a plurality of electrical contacts associated with said camera body;
   means for exchanging information between at least a part of said electrical contacts group and said plurality of electrical contacts, said exchanged information including defocus data determined by said camera body;
   means for selecting said information in accordance with a capability of said camera body to which said photographic lens is mounted;
   means for power zooming said photographic lens; and
   a controller that receives said defocus data from said camera body and selected by said selecting means, said power zooming means being actuated in accordance with said defocus data to drive said photographic lens in a direction in which a magnification of an image to be photographed is maintained constant.

2. The photographic lens of claim 1, wherein said selecting means comprises first means for selecting a first set of information or a second set of information and a third set of information, based on said electrical connection of said electrical contact group of said photographic lens and said plurality of electrical contacts of said camera body, and second means for selecting either said second set of information or said third set of information when said first selecting means selects said second set of information and said third set of information.

3. The photographic lens of claim 1, wherein said exchanged information includes information on a maximum F value data of said photographic lens, a minimum F value data of said photographic lens, and auto-/manual switching data of a diaphragm.

4. The photographic lens of claim 1, wherein said exchanged information comprises variable information that includes information on a maximum F value, a minimum F value, a focal length of said photographic lens, a forward displacement of a focusing lens, and a defocus coefficient.

5. The photographic lens of claim 4, wherein said exchanged information comprises variable information that is exchanged with said camera body from said photographic lens, and said defocus data and diaphragm data that is exchanged with said photographic lens from said camera body.

6. The photographic lens of claim 1, further comprising: a focus adjusting mechanism that controls a focal point; and means for controlling said focus adjusting mechanism.

7. The photographic lens of claim 6, wherein,
   said controller actuates said focus controlling means in accordance with said defocus data inputted from said camera body through said information exchanging means.

8. The photographic lens of claim 6, further comprising an association mechanism that is connected to a focus adjusting mechanism driving means that is provided on said camera body to drive said focus adjusting mechanism.

9. The photographic lens of claim 8, wherein said focus adjusting mechanism is driven through said association mechanism when said information exchanging means is selected.

10. The photographic lens of claim 8, wherein said controller arithmetically detects a displacement of said drive of said focus adjusting mechanism driving means on said camera body in accordance with said defocus data supplied by an object distance measuring means provided on said camera body through said information exchanging means and a defocus coefficient data stored in a memory.

11. The photographic lens of claim 6, wherein at least said defocus data and said focus controlling means are supplied from said camera body through one of said group of electrical contacts.

12. The photographic lens of claim 1, further comprising a diaphragm mechanism which actuates a diaphragm, a diaphragm control means for driving said diaphragm mechanism, and a diaphragm association mechanism which transmits a drive force of a diaphragm driving mechanism provided on said camera body to said diaphragm mechanism.

13. The photographic lens of claim 12, wherein said arithmetic/controller means actuates said diaphragm control means in accordance with diaphragm data inputted from said camera body through said information transmitting and receiving means.

14. The photographic lens of claim 12, wherein said diaphragm mechanism is driven by said diaphragm driving mechanism provided on said camera body when said information exchanging means is selected.

15. The photographic lens of claim 12, wherein at least said defocus data and said diaphragm control means is supplied from said camera body through one of said group of electrical contacts.

16. The photographic lens of claim 1, wherein at least said defocus data and said power zoom means are supplied from said camera body through one of said group of electrical contacts.

17. The photographic lens of claim 1, wherein said electrical contact group has a plurality of electrical contacts which are electrically insulated from each other and which are provided on the surface of a mount ring of a lens mount.

18. The photographic lens of claim 1, wherein said electrical contact group has at least one electrically insulated contact provided on a surface of a mount ring of a lens mount, and at least one electronically insulated contact is provided inside a mount ring of a lens mount.

19. The photographic lens of claim 1, wherein said means for selecting said exchanged information is based upon an electrical connection of said electrical contact group of said photographic lens and said plurality of electrical contacts of said camera body.

20. A camera body to which a photographic lens is selectively mountable, comprising:
   means for determining a defocus quantity of an image to be photographed;
   a plurality of electrical contacts that are provided on a camera body to which said photographic lens is selectively mounted;
   means for determining a type of photographic lens that is mounted to said camera body in accordance with a capability of said photographic lens mounted to said camera body;
   means for controlling said photographic lens in response to said type of determined photographic lens by transferring said defocus data to a controller in said photographic lens so that said controller controls a power zooming of said photographic lens to drive said photographic lens in a direction in which a magnification of said image to be photographed is maintained constant.

21. The camera body of claim 20, further comprising an object distance measuring means for detecting said defocus amount in accordance with a luminous flux of light that is incident thereupon through said photographic lens;
   means for driving a focus adjusting mechanism in accordance with said defocus amount detected by said object distance measuring means; and
   means for transmitting a driving power of said focus adjusting mechanism driving means to a focus adjusting means of said photographic lens.

22. The camera body of claim 21, wherein said controlling means actuates said focus adjusting mechanism driving means in accordance with said defocus amount of said object distance measuring means when a photographic lens having a focus adjusting mechanism and an association mechanism, which is connected to said focus adjusting mechanism driving means, is mounted to said camera body.

23. The camera body of claim 22, wherein said controlling means sends said defocus amount detected by said object distance measuring means to said controller in said photographic lens through said plurality of electrical contacts.

24. The camera body of claim 21, wherein when a photographic lens having a power zoom means, a focal length detecting means for detecting said focal length of said lens, a forward displacement detecting means for detecting a forward displacement of a focus lens and said controller is mounted to said camera body, said controlling means sends data representing said defocus amount detected by said object distance measuring means to said photographic lens through said plurality of electrical contacts, so that said controller determines said magnification of said image to be photographed based on information from said forward displacement detecting means when said defocus amount is zero and information from said focal length detecting means.

25. The camera body of claim 21, wherein at least said focus control means and said defocus data are supplied from said camera body through one of said plurality of electrical contacts.

26. The camera body of claim 20, further comprising an exposure control means for detecting a brightness of said image to be photographed so as to determine an F value and a shutter speed, and a diaphragm mechanism for driving a diaphragm driving means of said photographic lens in response to said exposure control means.

27. The camera body of claim 26, wherein said controlling means actuates an exposure mechanism driving means on accordance with said F value detected by said exposure control means when said photographing lens is mounted to said camera body.

28. The camera body of claim 26, wherein said controlling means sends said F value detected by said exposure means to said photographic lens through said plurality of electrical contacts to actuate said diaphragm control means in accordance with said F value when said a photographic lens having a diaphragm mechanism and a diaphragm control means for driving the diaphragm mechanism is mounted to said camera body.

29. The camera body of claim 28, wherein at least said defocus data and said diaphragm control means of said photographic lens are supplied through one of said plurality electrical contacts.

30. The camera body of claim 20, wherein said plurality of electrical contacts has a plurality of electrical contacts which are electrically insulated from each other and which are provided on a surface of a mount ring of a lens mount.

31. The camera body of claim 20, wherein said plurality of electrical contacts has at least one electrically insulated contact that is provided on a surface of a mount ring of a lens mount, and at least one electrically insulated contact that is provided inside a mount ring of a lens mount.

32. The camera body of claim 20, wherein a memory located in said photographic lens provides information to said camera body.

33. The camera body of claim 20, wherein an arithmetic/control means provides information to said camera body.

34. The camera body of claim 20, wherein said means for determining said type of photographic lens that is mounted to said camera body in accordance with said capability of said photographic lens to which said camera body is attached is based on an electrical contact connection between a group of electrical contacts on said photographic lens and said plurality of electrical contacts on said camera body.

35. A camera system, comprising:
   a photographic lens, said photographic lens comprising:
      a group of electrical contacts which are selectively connected to a camera body;
      means for exchanging information through at least a part of said electrical contact group, said exchanged information including defocus data that is determined by said camera body;

means for selecting specific information from said exchanged information in accordance with a capability of said camera body to which said photographic lens is mounted;

means for power zooming said photographic lens; and a controller that receives said defocus data from said camera body, said power zooming means being actuated in accordance with said defocus data to drive said photographic lens in a direction in which a magnification of an image to be photographed is maintained constant; and means on said camera body for selectively coupling said photographic lens to said camera body, said camera body comprising:

a plurality of electrical contacts provided on said coupling means to which said photographic lens is mounted for exchanging information, including said defocus data, with said photographic lens;

means for determining a type of photographic lens based on said electrical contact connection of said photographic lens; and means for controlling said photographic lens in response to said specific information in accordance with a capability of said photographic lens mounted to said camera body.

36. The camera system of claim 35, wherein said exchanged information comprises information on a maximum F value data of said lens, a minimum F value data of said lens, and auto/manual switching data of a diaphragm.

37. The camera system of claim 35, wherein said exchanged information comprises variable information that includes information on a maximum F value, a minimum F value, a focal length, a forward displacement of a focusing lens, and a defocus coefficient.

38. The camera system of claim 35, wherein said photographic lens further comprises:

a focus adjusting mechanism that controls focal point; and means for controlling said focus adjusting mechanism.

39. The camera system of claim 38, wherein, said controller actuates said focus control means in accordance with said defocus data inputted from said camera body through said information exchanging means.

40. The camera system of claim 39, wherein said controller arithmetically detects a displacement of a driving of said focus adjusting mechanism controlling means on said camera body in accordance with said defocus data and a defocus coefficient data that is stored in a memory.

41. A camera system, comprising:

a camera body, said camera body having means for determining a defocus amount of an image to be photographed;

a photographic lens that is associatable with said camera body, said photographic lens having a power zoom motor and a lens processor; and means for transferring said defocus amount from said camera body to said lens processor, wherein said power zoom motor is controlled by a signal issued by said lens processor in response to said received defocus amount so that a magnification of said photographic lens is compensated to become an original magnification.

42. The camera system of claim 41, wherein said defocus amount comprises one of a plurality of signals that control said power zoom motor.

43. The camera system of claim 41, wherein said power zoom motor drives said photographic lens in a direction in which said magnification of said image to be photographed remains constant.

44. The camera system of claim 41, wherein said defocus amount is determined in accordance with a luminous flux of light that passes through said photographic lens and impinges upon an object distance measuring sensor.

45. The camera system of claim 44, wherein said power zoom motor drives said photographic lens in a direction in which said magnification of said image to be photographed remains constant.

46. The camera system of claim 45, wherein said defocus amount determined by said camera body comprises a number of pulses required for driving a focusing lens of said photographic lens for autofocusing said photographic lens, said number of pulses being transferred to said lens processor to determine said signal that controls said power zoom motor.

47. The camera system of claim 41, wherein said defocus amount determined by said camera body comprises a number of pulses required for driving a focusing lens of said photographic lens for autofocusing said photographic lens, said number of pulses being transferred to said lens processor to determine said signal that controls said power zoom motor.

48. A camera body that is selectively attachable to a photographic lens, comprising:

a group of electrical contacts provided on said camera body to which said photographic lens is selectively attachable;

means for judging the type of said photographic lens based on an electrical contact connection of said photographic lens;

first means for controlling said photographic lens in response to a first set of information comprising a pair of information of said electrical contacts as a whole and which represents a first information type in which said photographic lens supplies only said fist information to said camera body;

second means for controlling said photographic lens in response to a plurality of second information which is peculiar to said photographic lens and which represent a second information type in which said photographic lens supplies said second information to said camera body through a memory means connected to said electrical contact group; and third means for controlling said photographic lens in response to a third set of information which represents a third information type in which said photographic lens has an arithmetic/control means connected to said electrical contact group in addition to said memory means, receiving and transmitting said third information from and to said camera body.

* * * * *

UNITED STATES PATENT AND TRADEMARK OFFICE
CERTIFICATE OF CORRECTION

PATENT NO. : 5,255,043
DATED : October 19, 1993
INVENTOR(S) : Masahiro Kawasaki

It is certified that error appears in the above-indentified patent and that said Letters Patent is hereby corrected as shown below:

At column 20, line 67 (claim 15, line 3) change "is" to ---are---.
    At column 22, line 21 (claim 27, line 3) change "on" to ---in---.
    At column 22, line 29 (claim 28, line 6) delete "said".
    At column 22, line 30 (claim 28, line 7) change "the" to ---said---.

Signed and Sealed this

Eleventh Day of July, 1995

Attest:

BRUCE LEHMAN

*Attesting Officer*     Commissioner of Patents and Trademarks